(12) United States Patent
Wongkar et al.

(10) Patent No.: US 9,183,241 B2
(45) Date of Patent: Nov. 10, 2015

(54) SYSTEM, METHOD AND COMPUTER PROGRAM PRODUCT FOR EFFICIENT CACHING OF HIERARCHICAL ITEMS

(71) Applicant: Open Text S.A., Luxembourg (LU)

(72) Inventors: Adison Hana Wongkar, Austin, TX (US); Shaival Gupta, Austin, TX (US)

(73) Assignee: Open Text S.A., Luxembourg (LU)

( * ) Notice: Subject to any disclaimer, the term of this patent is extended or adjusted under 35 U.S.C. 154(b) by 0 days.

(21) Appl. No.: 14/223,785

(22) Filed: Mar. 24, 2014

(65) Prior Publication Data

US 2014/0207825 A1  Jul. 24, 2014

Related U.S. Application Data

(63) Continuation of application No. 13/435,427, filed on Mar. 30, 2012, now Pat. No. 8,713,056.

(60) Provisional application No. 61/469,517, filed on Mar. 30, 2011.

(51) Int. Cl.
  *G06F 7/00* (2006.01)
  *G06F 17/30* (2006.01)

(52) U.S. Cl.
  CPC .... *G06F 17/30327* (2013.01); *G06F 17/30091* (2013.01)

(58) Field of Classification Search
  CPC .................. G06F 17/30961; G06F 17/30958; G06F 17/30861; G06F 2221/2151; G06F 2221/2145; G06F 2221/2113; G06F 17/30873; G06F 17/30994; G06F 2221/214; G06F 17/30864; Y10S 707/99933; Y10S 707/99939; Y10S 707/99931; Y10S 707/99936; H04L 63/102; H04L 63/0421; H04L 63/104
  See application file for complete search history.

(56) References Cited

U.S. PATENT DOCUMENTS

| | | | |
|---|---|---|---|
| 4,823,310 | A | 4/1989 | Grand |
| 5,778,222 | A | 7/1998 | Herrick et al. |

(Continued)

FOREIGN PATENT DOCUMENTS

| | | |
|---|---|---|
| EP | 1594047 A2 | 11/2005 |
| EP | 1857945 A1 | 11/2007 |

(Continued)

OTHER PUBLICATIONS

Office Action issued for U.S. Appl. No. 13/435,427, mailed Jun. 20, 2013, 11 pages.

(Continued)

*Primary Examiner* — Augustine K Obisesan
(74) *Attorney, Agent, or Firm* — Sprinkle IP Law Group

(57) ABSTRACT

Embodiments disclosed herein provide a "lazy" approach in caching a hierarchical navigation tree with one or more associated permission trees. In one embodiment, only a portion of a cached permission tree is updated. One embodiment of a method may comprise determining whether a dirty node exists by comparing tree timestamps of the permission tree and the master tree. If the tree timestamp of the master tree is temporally more recent than the tree timestamp of the permission tree, the permission tree has a dirty node and the method may operate to check node timestamps of the master and permission trees. This process may be repeated until the dirty node is found, at which time a portion of the permission tree associated with the dirty node may be reconstructed, rather than the entire permission tree itself, thereby eliminating or significantly reducing access time to the cached permission tree.

21 Claims, 23 Drawing Sheets

(56) References Cited

U.S. PATENT DOCUMENTS

| | | | |
|---|---|---|---|
| 6,516,336 B1 | 2/2003 | Davis et al. | |
| 6,978,271 B1* | 12/2005 | Hoffman et al. | 1/1 |
| 7,051,038 B1 | 5/2006 | Yeh et al. | |
| 7,536,476 B1 | 5/2009 | Alleyne | |
| 7,743,074 B1* | 6/2010 | Parupudi et al. | 707/802 |
| 8,713,056 B1 | 4/2014 | Wongkar et al. | |
| 2001/0042063 A1 | 11/2001 | Ebert | |
| 2002/0007340 A1 | 1/2002 | Isaf et al. | |
| 2002/0093540 A1* | 7/2002 | Mariani et al. | 345/853 |
| 2003/0037040 A1 | 2/2003 | Beadles et al. | |
| 2003/0084324 A1 | 5/2003 | Koved et al. | |
| 2005/0015397 A1 | 1/2005 | Abineri et al. | |
| 2005/0065963 A1 | 3/2005 | Ziemann et al. | |
| 2005/0114655 A1 | 5/2005 | Miller et al. | |
| 2005/0240857 A1* | 10/2005 | Benedict et al. | 715/500 |
| 2005/0243020 A1* | 11/2005 | Steeb et al. | 345/1.3 |
| 2006/0153097 A1 | 7/2006 | Schultz | |
| 2006/0218030 A1 | 9/2006 | Ghosh et al. | |
| 2007/0097138 A1 | 5/2007 | Sorotokin et al. | |
| 2007/0214497 A1 | 9/2007 | Montgomery et al. | |
| 2007/0288856 A1 | 12/2007 | Butlin et al. | |
| 2008/0052043 A1* | 2/2008 | Pomplun | 702/187 |
| 2008/0208536 A1* | 8/2008 | Bondi | 702/186 |
| 2009/0037500 A1 | 2/2009 | Kirshenbaum | |
| 2009/0083213 A1* | 3/2009 | Haynes et al. | 707/2 |
| 2009/0265380 A1 | 10/2009 | Wright et al. | |
| 2010/0280996 A1 | 11/2010 | Gross, IV et al. | |
| 2011/0066982 A1* | 3/2011 | Paulsami et al. | 715/835 |
| 2011/0072033 A1* | 3/2011 | White et al. | 707/768 |
| 2011/0302195 A1 | 12/2011 | Cai et al. | |
| 2012/0173845 A1 | 7/2012 | Venkataramani | |
| 2013/0124528 A1 | 5/2013 | Gourdol et al. | |

FOREIGN PATENT DOCUMENTS

| | | |
|---|---|---|
| EP | 2105879 A2 | 9/2009 |
| WO | WO0182143 A2 | 11/2001 |
| WO | WO0214989 A2 | 2/2002 |
| WO | WO2006069311 A2 | 6/2006 |

OTHER PUBLICATIONS

Jaeger et al. "Policy Management Using Access Control Spaces," ACM Transactions on Information and System Security, 6(3) pp. 327-364, 2003.

Notice of Allowance issued for U.S. Appl. No. 13/435,427, mailed Dec. 6, 2013, 14 pages.

* cited by examiner

SYSTEM, METHOD AND COMPUTER PROGRAM PRODUCT FOR EFFICIENT CACHING OF HIERARCHICAL ITEMS

CROSS-REFERENCE TO RELATED APPLICATION(S)

This application is a continuation of, and claims a benefit of priority under 35 U.S.C. §120 of the filing date of U.S. patent application Ser. No. 13/435,427, filed Mar. 30, 2012, entitled "SYSTEM, METHOD AND COMPUTER PROGRAM PRODUCT FOR EFFICIENT CACHING OF HIERARCHICAL ITEMS," which is a conversion of, and claims a benefit of priority under 35 U.S.C. §119 from U.S. Provisional Application No. 61/469,517, filed Mar. 30, 2011, entitled "SYSTEM, METHOD AND COMPUTER PROGRAM PRODUCT FOR EFFICIENT CACHING OF HIERARCHICAL ITEMS," the entire contents of which are fully incorporated by reference herein.

TECHNICAL FIELD

Embodiments disclosed herein relate generally to the caching of hierarchical items. More particularly, embodiments disclosed herein relate to a system, method, and computer program product for efficiently caching navigation items in hierarchical data structures.

BACKGROUND OF THE RELATED ART

Advances in information technology continue to bring challenges to IT management. A push for IT management comes from the dynamic needs of companies as they face growth and development. Growing businesses often need to manage access of particular information among employees. This is especially true for companies who utilize modern enterprise websites that employ hierarchical navigation trees. Modern enterprise web sites typically employ hierarchical navigation trees to access certain pages and functionalities. For example, a modern enterprise may place employees with certain navigational restrictions within their company intranet site. Often, companies with a large number of employees may have a massive hierarchical navigation tree in the order of, for example, 1000 or more and may restrict access to some navigation menu items or branches to certain groups of users. Because internal information may be sensitive for different employees associated with a company, a company may want to ensure that restricted access to information is enforced. Difficulties may arise when companies seek to update information in the tree that may affect permissions for particular user groups.

One approach may involve invalidating the entire navigation tree from the cache, letting subsequent access to the cache destroy the cache, and reconstructing the entire cache for the menu tree item. When the navigation tree hierarchy is not too deep and there are not too many different user group permissions, this method may suffice. But it is far from adequate when dealing with a massive navigation menu item tree and 1000 or more user groups with potentially different permissions to access each of these nodes or branches, since users accessing the system may be forced to wait for minutes just to access one page in the website, while the system is rebuilding the tree cache. This can be costly and time consuming. Users may spend minutes trying to access a webpage while updating and repermissioning is being completed. This is also true for changes in shared information between various websites.

SUMMARY OF THE DISCLOSURE

There exists a need for companies to efficiently update navigational tree items with associated permissions in a cost effective and efficient manner. To this end, embodiments disclosed herein provide a system, method and computer program product having at least one non-transitory computer readable medium storing computer instructions translatable by a machine for efficiently caching a navigation item tree and permissions. Embodiments disclosed herein can provide algorithms for efficiently caching a navigation item tree by finding a "dirty" node within a permission tree and reconstructing the portion of the permission tree in need of updating rather than reconstructing the entire permission tree.

In embodiments disclosed herein, a user may wish to access a particular piece of information from a company's navigational site. The user may belong to a specific user group with limited permission to access certain items within a company's navigational site. In some embodiments, a user may access an item within a permission tree. In one embodiment, the permission tree may contain navigational items that need to be updated.

In embodiments disclosed herein, a permission tree may be updated to reflect updated items that correspond to a company's master navigational tree. In some embodiments, there may be a check to determine whether a "dirty" node exists within a permission tree. To do so, in one embodiment, the tree timestamp of a root node of the master navigational tree may be compared to the tree timestamp of a root node of a permission tree. In one embodiment, there may be traversal in the examination of nodes in the permission tree in order to find a "dirty" node exists within a permission tree. In one embodiment, a "dirty" node within a permission tree will have a temporally older node timestamp and tree timestamp than a corresponding node in a master navigational tree.

In one embodiment, once a "dirty" node has been found, that portion of the permission tree may be reconstructed to correspond to a portion of the master navigation tree. In some embodiments, reconstructing a portion of the permission tree may include adding a node, deleting a node, editing a node, re-ordering a node, re-parenting a node, or the like.

In one embodiment, once reconstruction is complete, an update of the permission tree may be made. In one embodiment, an update of the node timestamp and tree timestamp of the "dirty" node may be completed to reflect the updated time the "dirty" node was updated. In another embodiment, the parent node of the "dirty" node may also have its node timestamp and tree timestamp updated. In yet another embodiment, any grand-parent, great-grandparent, great-great-grandparent, etc., of the "dirty" node may have its tree timestamp updated to reflect the time the permission tree was updated.

Software implementing embodiments disclosed herein may be implemented in suitable computer-executable instructions that may reside on a computer-readable storage medium. Within this disclosure, the term "computer-readable storage medium" refers to any non-transitory data storage medium that can be read by a processor. Examples of non-transitory computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

In one embodiment, a computer program product may comprise at least one non-transitory computer readable medium storing instructions translatable by a computer to implement a method, the method comprising finding a dirty node within a permission tree responsive to a user action, wherein a root node in the permission tree has a tree timestamp that is temporally older than a tree timestamp in a corresponding root node in a master tree. The method may further comprise reconstructing the permission tree and updating the permission tree. The method may also consist of updating the tree timestamps and node timestamps for the dirty node and the tree timestamp for each parent node within the permission tree. The tree timestamp of a permission tree indicates when the permission tree was last "touched" or updated.

These and other aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 21 depicts a diagrammatic representation of a screenshot illustrating a view of a version of the network site implementing the permission tree of FIG. 20;

FIG. 25 depicts a diagrammatic representation of a screenshot corresponding to the network site implementing the updated permission tree of FIG. 24.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices.

Before discussing embodiments of the invention, a hardware architecture where embodiments disclosed herein can be implemented is described with reference to FIG. 1. As one skilled in the art can appreciate, the exemplary architecture shown and described herein with respect to FIG. 1 is meant to be illustrative and not limiting.

Figure 1:
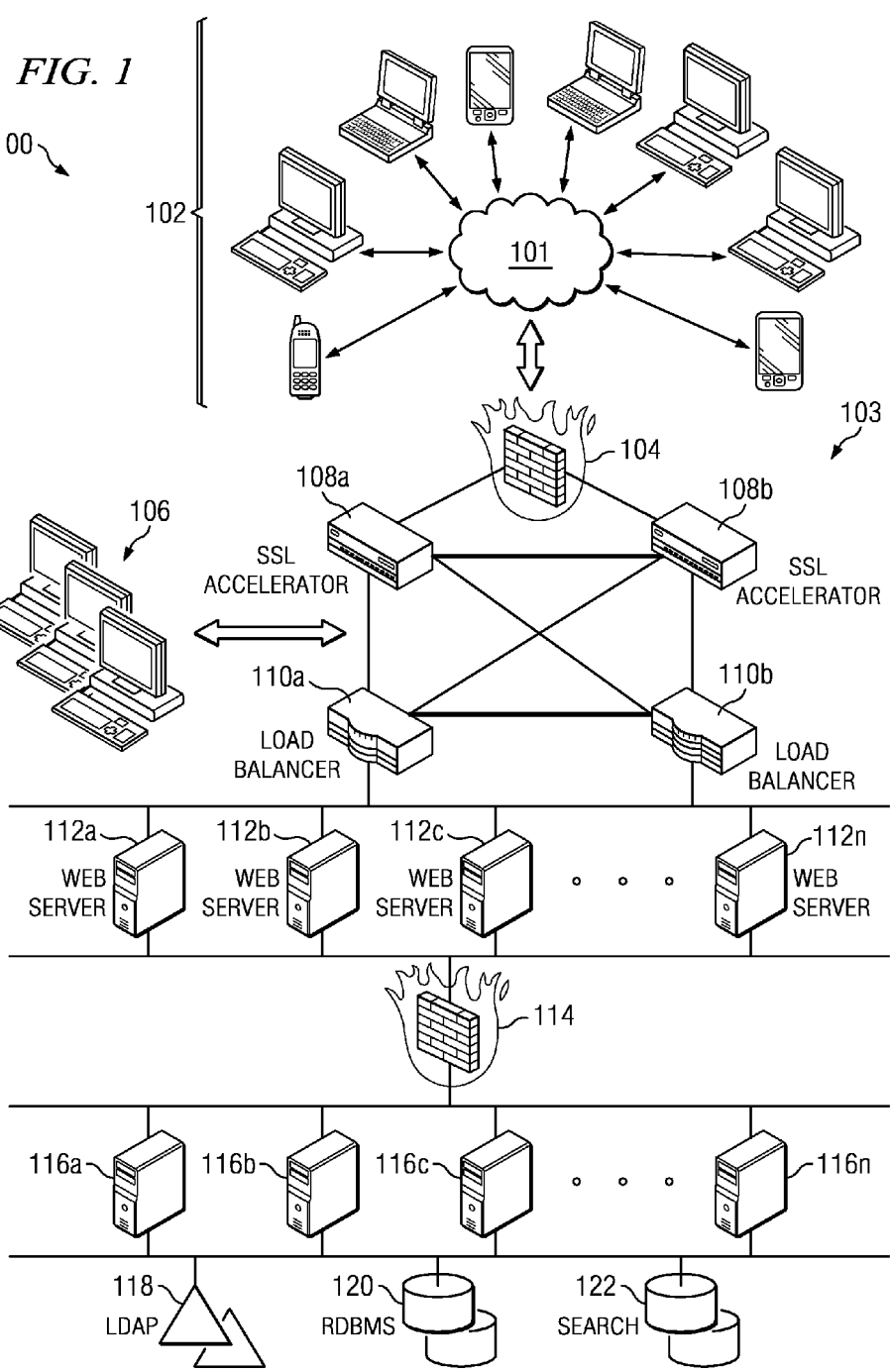
FIG. 1 depicts a diagrammatic representation of an example network architecture wherein some embodiments disclosed herein may be implemented.

In FIG. 1, computing environment 100 may comprise client machines 102 bidirectionally coupled to network 101. Network 101 may comprise the Internet. Clients 102 may include, for example, desktop computers, laptop computers, personal digital assistants, handheld computers, cellular phones, and any electronic devices capable of storing and processing information and network communication. Virtually any piece of hardware or electronic device capable of running client software and communicating with a server can be considered a client machine. As an example, clients 102 may include a central processing unit (CPU), read-only memory (ROM), random access memory (RAM), hard drive (HD) or non-volatile memory, and input/output (I/O) device(s). An I/O device may be a keyboard, monitor, printer, electronic pointing device (e.g., mouse, trackball, etc.), or the like. The hardware configuration of client machines can be representative to other devices and computers alike coupled to the Internet.

Computing devices 106 may be communicatively connected to a public network via firewall 104. One example of a public network might be the Internet. Computing devices 106 may be part of a private or internal network in enterprise computing environment 103. A company's intranet might be an example of a private network. Employees of the company may use various computing devices 106 to access servers in enterprise computing environment 103. Employees of the company may also use various client devices 102 to access the company's intranet using a secured connection or tunneling channel through the public network. Firewall 104 may be configured to allow or deny network transmissions from and to the private network based upon a particular set of rules to protect the private network from unauthorized access while permitting allowed communications to pass through. Firewall 104 may be implemented on one or more devices connected to Secured Socket Layer (SSL) Accelerators 108a-108b. SSL Accelerators 108a-108b may help to offload processor-intensive public key encryption algorithms involved in SSL transactions. Network communications, including those to and from computing devices 106, may be directed to Load Balancers 110a-110b. Load Balancers 110a-110b may be communicatively connected to a plurality of or a cluster of Web Servers 112a-112n residing at the presentation tier of an example of client-server architecture. Web servers 112a-112n may be communicatively connected to application servers 116a-116n via Firewall 114. In one embodiment, Firewall 114 may allow only authorized users to access application servers at the logic tier and/or database servers at the data tier. Example servers at the data tier may include Lightweight Directory Access Protocol (LDAP) databases 118, Relational Database Management Systems (RDBMS) 120, Search Databases 122, and the like. Tiered client-server architecture is known to those skilled in the art and thus is not further described herein. Other types of client-server architecture may also be adapted to implement embodiments disclosed herein.

As discussed above, growing businesses often need to manage access of particular information among employees. In this context, web servers 112a-112n may be configured to host one or more enterprise websites. Such an enterprise website may comprise a set of pages and functionalities and may employ a hierarchical navigation tree. For example, certain groups of users in enterprise computing environment 103 may be associated with certain navigational restrictions and may restricted or limited access to navigation menu items (nodes) or branches in the hierarchical navigation tree. As the size of the tree grows exponentially, it can be extremely difficult to enforce different levels of access control to various nodes/branches in the hierarchical navigation tree while maintaining accuracy and freshness of information in the tree.

Updating the information in a large hierarchical navigation tree can be difficult and cumbersome because access to such information must also be updated for a particular user. For example, a company may utilize a hierarchical navigation tree in the order of 1000 or more menu items and may restrict access to some navigation menu items or branches to certain groups of users. The number of groups may also be large, in the order of 1000 or more. Companies may also want to reuse certain parts of the navigation tree in other sites. Because organizations do not have downtime in making changes, they want to make live updates to the navigation tree hierarchy while the system is being accessed by users. The live updates may affect a particular user without permission to the updated information in a webpage. Furthermore, when companies want to reuse information for other websites, changes made in the shared hierarchy must also be reflected in other sites that use content hierarchy. To enable fast delivery of updated information, an efficient caching system is needed to minimize cost associated with wait time when reconstructing a navigation menu item.

Figure 2:
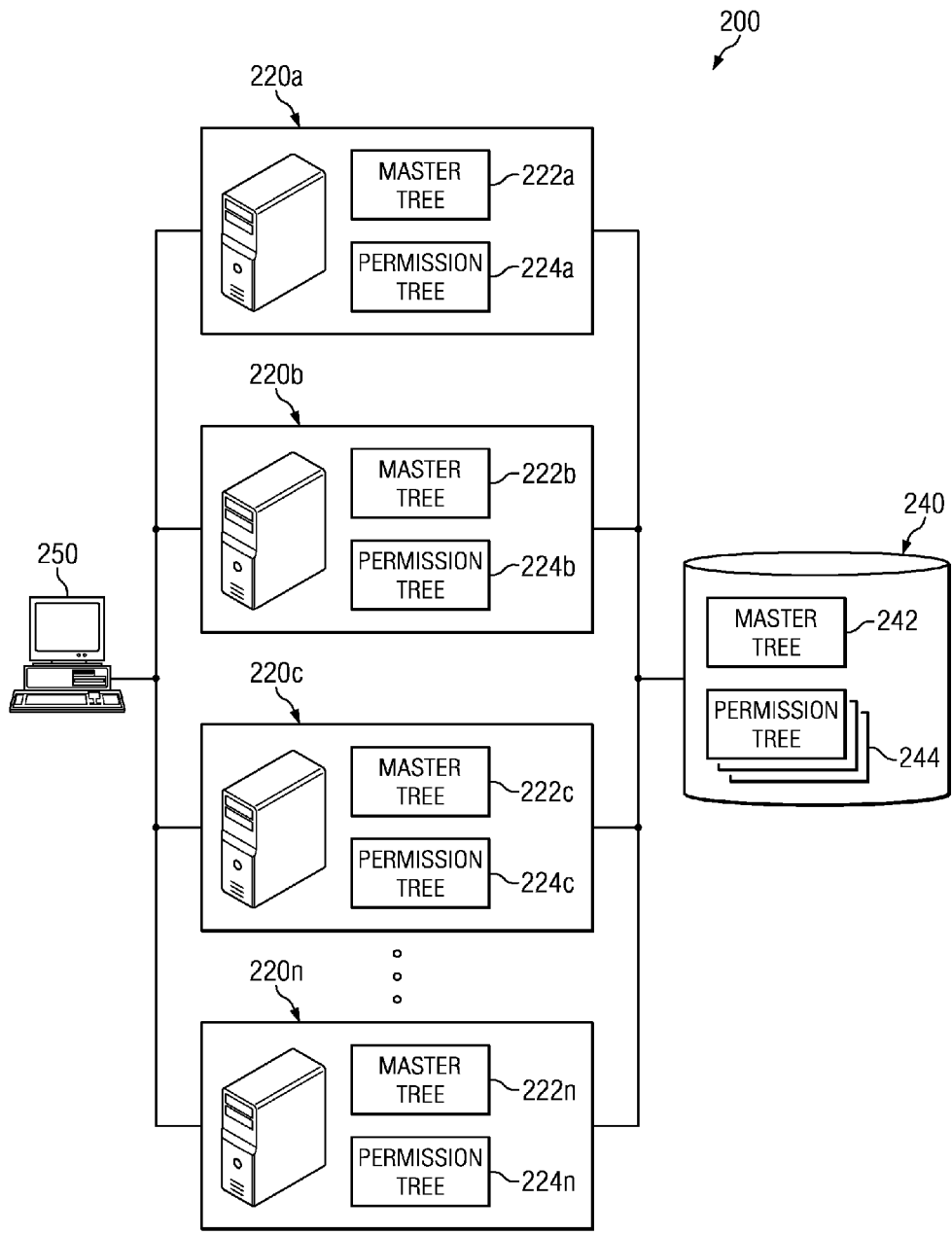
FIG. 2 depicts a diagrammatic representation of a network computing environment wherein some embodiments disclosed herein may be implemented.

With that in mind, attention is now directed to FIG. 2 which depicts a diagrammatical representation of network computing environment 200 where embodiments disclosed herein can be implemented. Network computing environment 200 may implement an embodiment of enterprise computing environment 103 and may comprise client and server machines as described above with reference to FIG. 1. For example, client 250 may represent a client machine communicatively connected to a server in network computing environment 200 over a secured external network connection (client machine 102) or an internal network connection (computing device 106).

As illustrated in FIG. 2, the server with which client 250 is communicatively connected may be part of a cluster of servers 220a-220n. Servers 220a-220n may be reside in various physical locations. For example, server 220a may reside on the eastern U.S. coast, server 220b may reside in the central part of U.S., server 220c may reside on the western U.S. coast, and so on. Each server may be communicatively connected to one or more database servers and/or data storage devices/locations. For the sake of brevity, only database 240 is shown in FIG. 2. In one embodiment, database 240 may store Master Navigation Tree 242 and a plurality of Permission Trees 244 for different user groups within an enterprise. In one embodiment, there may be a single Master Tree for an enterprise website. There may be a one-to-one relationship between a user group and a Permission Tree, although a single user may belong to one or more user groups. Master Tree 242 and Permission Trees 244 can be stored on the same or different non-volatile memories and/or data storage devices.

In one embodiment, servers 220a-220n may have synchronized internal time clocks. In another embodiment, servers 220a-220n may have different internal time clocks. Each of server 220a-220n may cache a copy of Master Tree 242 and Permission Trees 244 in a local cache or a caching framework in network computing environment 200. That is, each cached copy of Master Tree 242 and Permission Trees 244 may reside on or otherwise be accessible by a server in the server cluster at the logic tier. In one embodiment, the internal time clocks for servers 220a-220n may be used to maintain timestamps for the cached Master Tree 222a-222n and Permission Trees 224a-224n. In one embodiment, if the internal clocks are not synchronized, each cached copy of the Master Tree and Permission Trees located on servers 220a-220n may have different timestamps. In another embodiment, if the internal clocks for servers 220a-220n are synchronized, each cached copy of the Master Tree and Permission Trees may have the same timestamp.

A master hierarchical navigation tree may comprise a large number of nodes representing an organization of menu items of an enterprise website. As a non-limiting example, Master Tree 242 may comprise nodes in the order of 1000 or more nodes and may restrict navigation paths and/or nodes to certain users. The number of users and user groups may also be large, for instance, in the order of 1000 or more. The larger such a tree becomes, the longer it takes to update the entire tree. Increasingly, there is a need and challenge to quickly implement changes in a hierarchical navigation tree structure and permissioning thereof without losing performance, reliability, and availability. Embodiments disclosed herein make use of the fact that live updates to a hierarchical navigation tree can be incremental and only affect a few nodes. To avoid having to alter all nodes in the tree (by invalidating the entire hierarchical navigation tree), embodiments disclosed herein utilize multiple timestamps to invalidate only those nodes affected by a change. More specifically, a new timestamp mechanism is utilized to signal parent nodes upstream to an affected node or nodes that the child/children node(s) is/are dirty and need(s) to be rebuilt.

Figure 3:
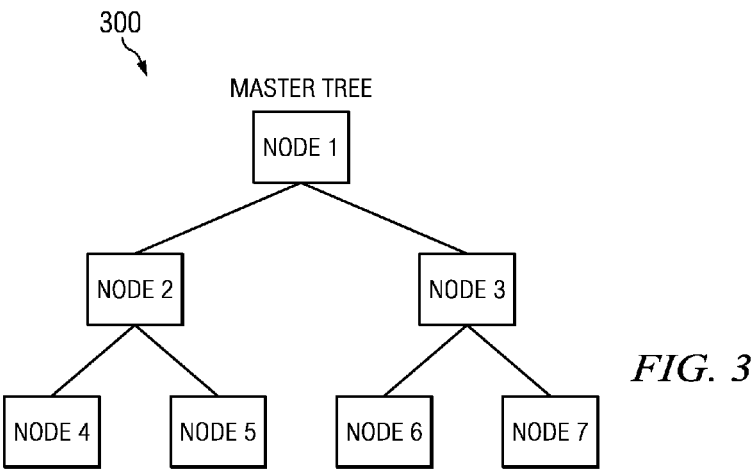
FIG. 3 depicts a diagrammatical representation of one example of a master hierarchical navigation tree.

FIG. 3 depicts a diagrammatical representation of one example of a master hierarchical navigation tree that may be implemented in network computing environment 200. Master Tree 300 may implement an embodiment of Master Tree 242. In this example, Master Tree 300 may comprise root node 1 and child branch nodes 2 and 3. Node 2 may reference child nodes 4 and 5. Node 3 may reference child nodes 6 and 7. As discussed above, not all users may be allowed to access the entire Master Tree 300. Various parts and/or branches of Master Tree 300 may be associated with various levels of access control. A certain group of users may be permitted to navigate to a certain node(s) or particular part(s) of Master Tree 300. Thus, Master Tree 300 may be associated with one or more Permission Trees, each of which may comprise a set of nodes accessible by a particular group of users.

Figure 4:
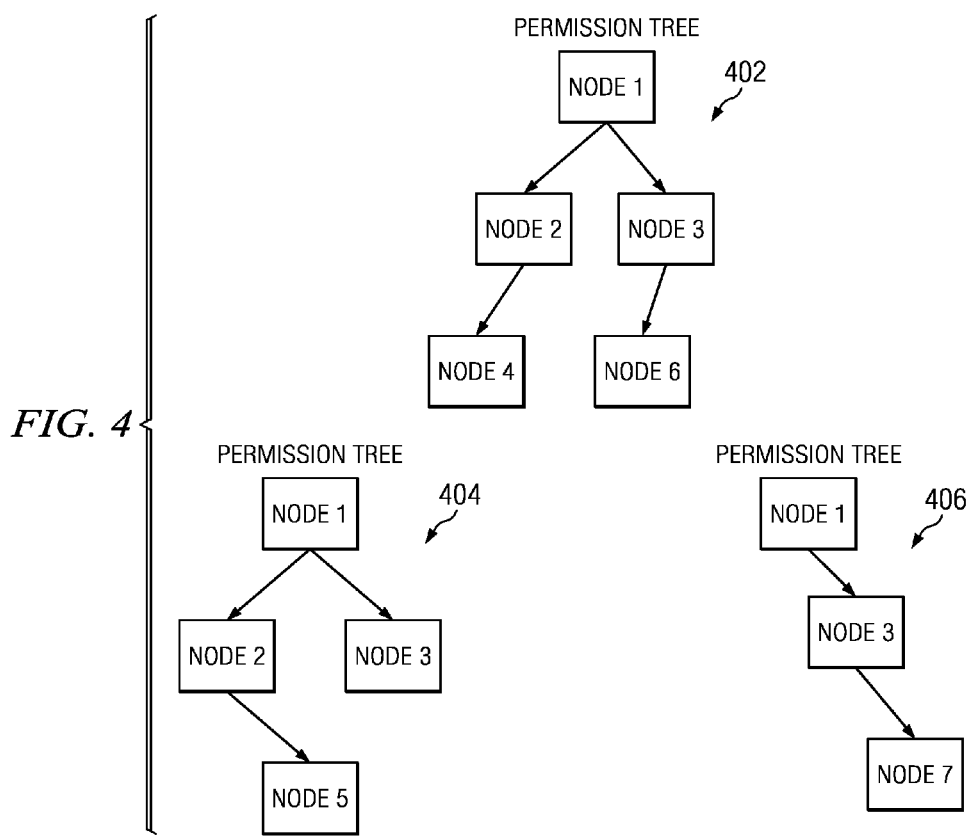
FIG. 4 depicts a diagrammatic representation of example permission trees that may be associated with the master hierarchical navigation tree shown in FIG. 3.

FIG. 4 illustrates example Permission Trees that may be associated with Master Tree 300. In this example, Master Tree 300 can have corresponding Permission Trees 402, 404 and 406, each representing a particular part of Master Tree 300 accessible to a particular group of users. In this example, users in a first group may be permitted to access nodes 1, 2, 3, 4 and 6 of Master Tree 300. This first group's access restriction is reflected in Permission Tree 402. Users in a second group may have permission to access nodes 1, 2, 3 and 5 in Master Tree 300. The second group's access restriction is reflected in Permission Tree 404. Users in a third group may have permission to access nodes 1, 3 and 7 of Master Tree 300. The third group's access restriction is reflected in Permission Tree 406. In one embodiment, a user may have access to multiple groups. In one embodiment, a hierarchical cache may cache all permission trees associated with a master tree along with the master tree itself.

Figure 5:
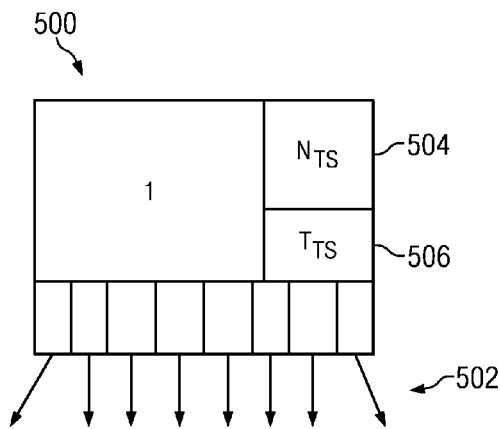
FIG. 5 and FIG. 6 depict various example configurations of a node.
Figure 6:
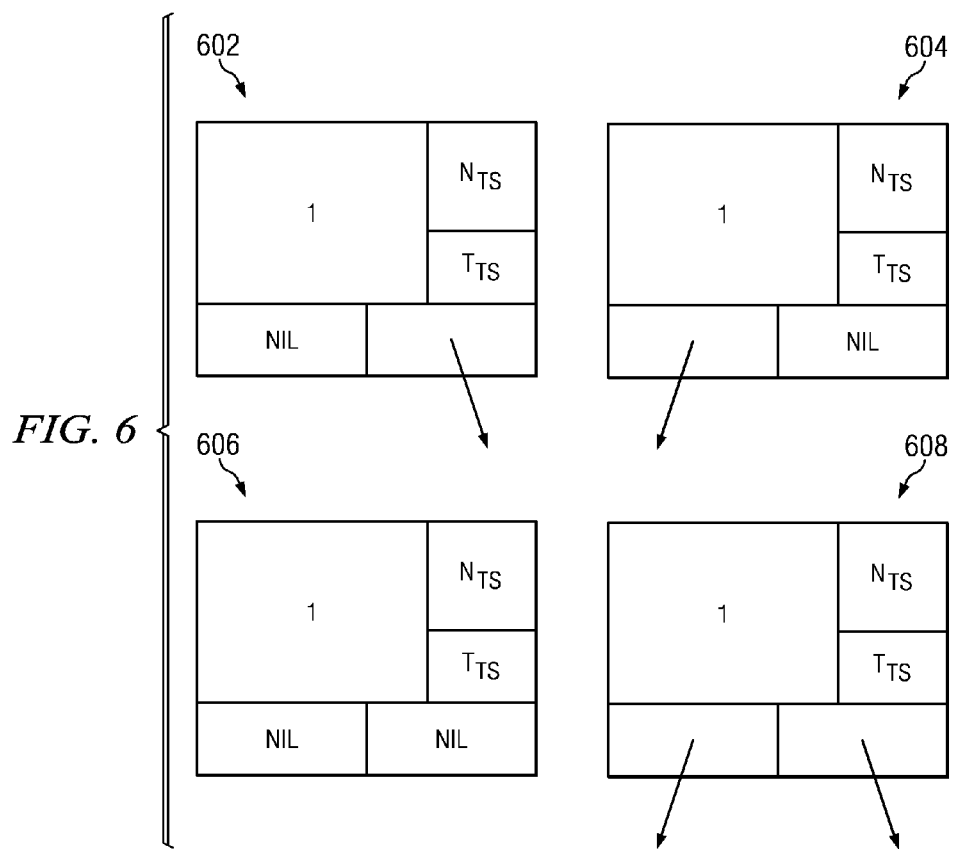

Within this disclosure, a node can be configured in various ways. For illustrative purposes, FIG. 5 and FIG. 6 depict various example configurations of a node. In FIG. 5, node 500 may represent node 1 in a tree and may comprise a plurality of pointers 502, each pointing to a child node. Node 500 may be configured with NodeTimestamp ($N_{TS}$) 504 and TreeTimestamp ($T_{TS}$) 506. In one embodiment, $N_{TS}$ 504 can be configured to keep track of a temporal point in time when the node was last updated. In one embodiment, $T_{TS}$ 506 can be configured to keep track of a temporal point in time when the tree was last accessed. Node 500 can be a binary or non-binary node. Further, node 500 can have any number of children or have no children at all.

FIG. 6 illustrates example nodes 602, 604, 606 and 608 with zero or more children. Each of nodes 602, 604, 606 and 608 may comprise a $T_{TS}$, a $N_{TS}$, and zero or more pointers. Each pointer may reference a child node. A node that has no children may be a root node or a leaf node. Node 606 is an example of a node having no children.

Whenever a cache is accessed, for instance, in response to a request from a user, there can be a need to update a permission tree associated with the user. A system implementing the invention disclosed herein may operate to compare the $T_{TS}$ of the permission tree with the $T_{TS}$ of a corresponding master tree. The permission tree may be considered "dirty" if the master tree has a temporally more recent $T_{TS}$. This temporal difference can be an indication that some portion of the permission tree must be rebuilt, but not necessarily the entire permission tree.

Figure 7:
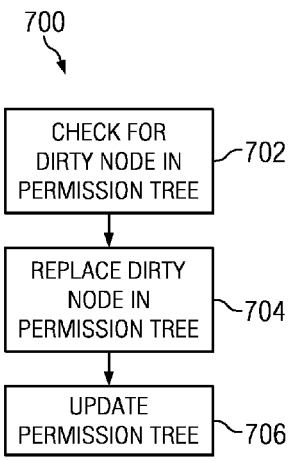
FIGS. 7-9 illustrate by example embodiments of a method for efficient caching of hierarchical items.
Figure 9:
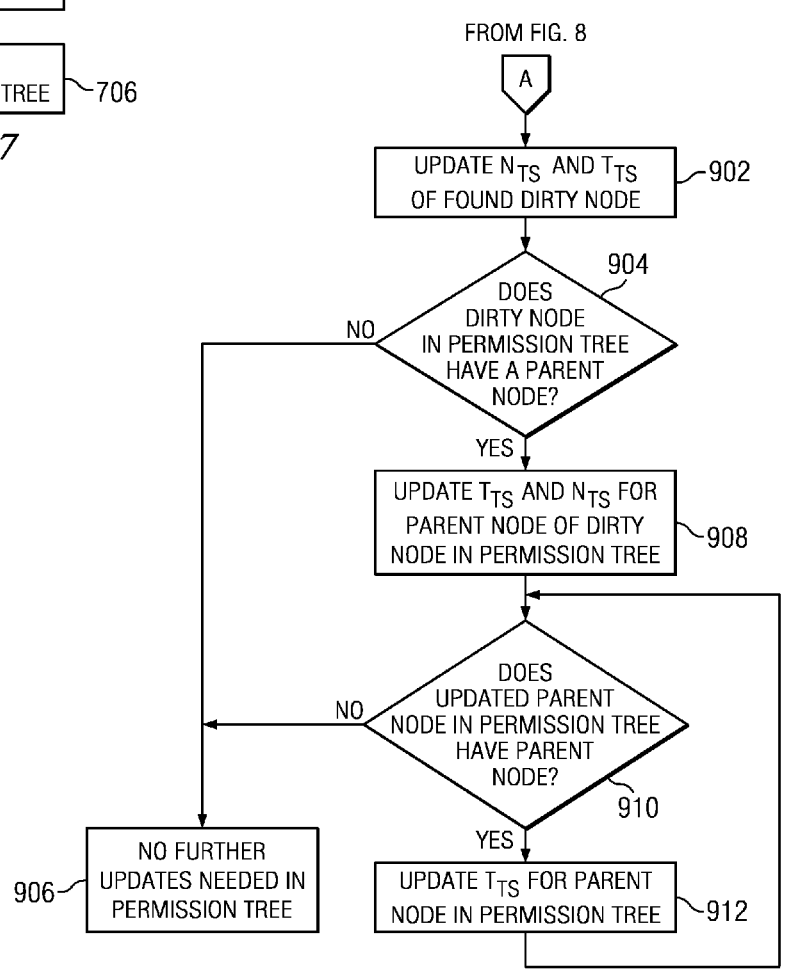
Figure 8:
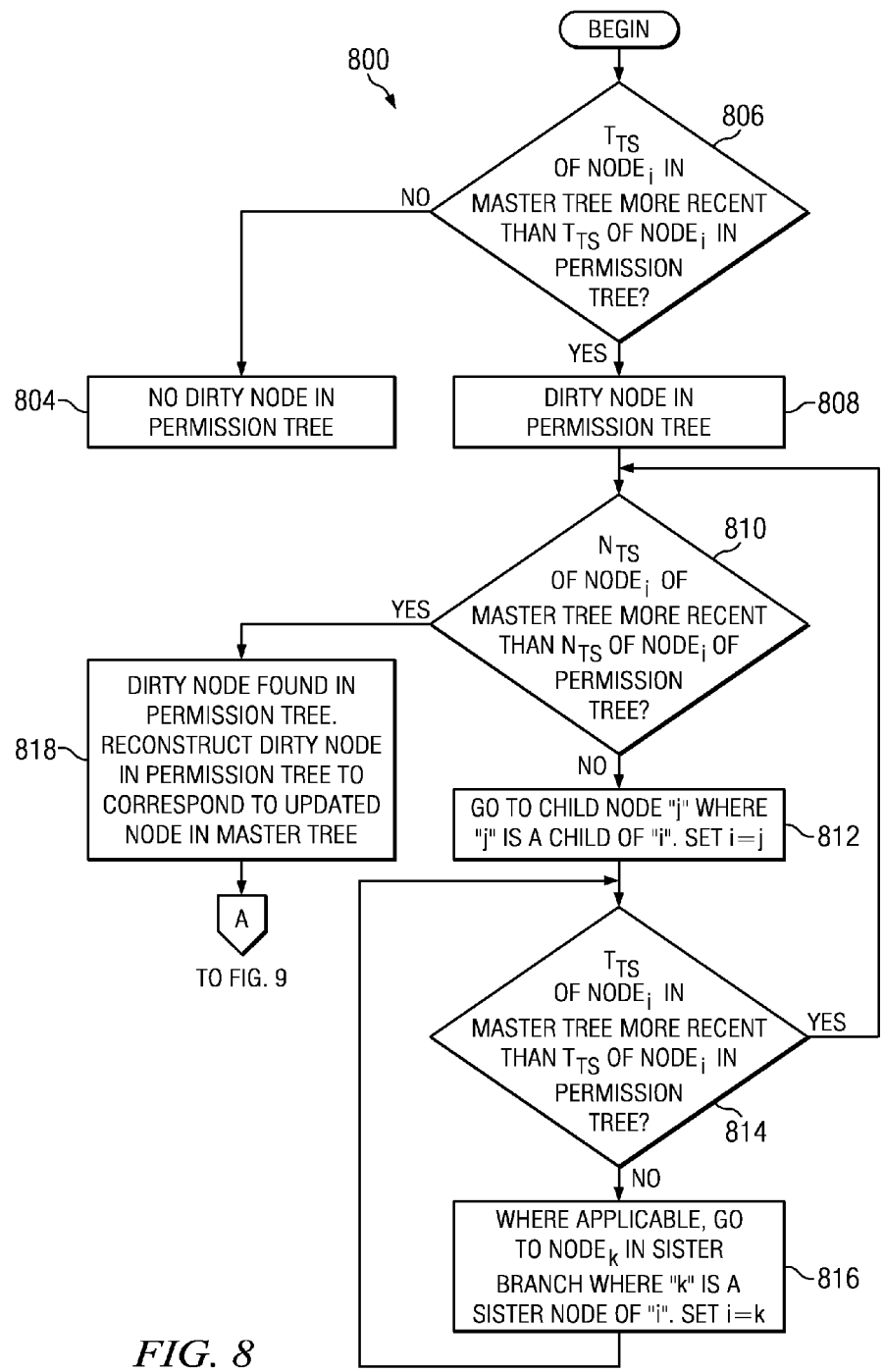

FIGS. 7-9 illustrate by example embodiments of a method for efficient caching of hierarchical items. More specifically, FIG. 7 depicts a top level example flow 700 for determining whether there is a "dirty" node in a tree. FIG. 8 depicts a more detailed example flow 800 for determining whether a dirty node exists in a particular branch of a permission tree. FIG. 9 shows an example flow 900 for updating a permission tree's NodeTimestamp ($N_{TS}$) and TreeTimestamp ($T_{TS}$).

Flow 700 may comprise checking whether a dirty node exists within a permission tree (step 702). One way to determine whether a dirty node exists within a permission tree is by comparing the $T_{TS}$ of the root node of the permission tree and the $T_{TS}$ of the root node of the permission tree. If the $T_{TS}$ of the root node of the master tree is temporally more recent than the $T_{TS}$ of the root node of the permission tree, the permission tree would need to be updated and flow 700 may proceed to locate and replace the dirty node in the permission tree (step 704). Where applicable, any parent of the dirty node in the permission tree is also updated (step 706).

Responsive to a user request to access information, a server implementing an embodiment of flow 800 may query a cache to determine if the $T_{TS}$ of a Node$_i$ in a Master Tree is more temporally recent than the $T_{TS}$ of Node$_i$ in a Permission Tree (step 806). In one embodiment, in this initial query, comparing the $T_{TS}$ associated with the root node of the Master Tree with the $T_{TS}$ associated with the root node of the Permission Tree can give an indication of when the last time the Master tree or Permission tree had been touched. If the $T_{TS}$ of the Master Tree is not more temporally recent than the $T_{TS}$ of the Permission Tree for Node$_i$, then this may be an indication that there is not a "dirty" node within the Permission Tree (as indicated in block 804). If the $T_{TS}$ of the root node of the Master Tree is temporally more recent than the $T_{TS}$ of the root node of the Permission Tree, then this can be an indication that there is a "dirty" node in the Permission Tree (as indicated in block 808). This may point out that the Master Tree was more recently "touched" or updated in comparison to the Permission Tree.

If there is a dirty node in the Permission Tree, flow 800 may further comprise determining whether Node$_i$ of the Master Tree has a temporally more recent $N_{TS}$ than the $N_{TS}$ of Node$_i$ in the Permission Tree (step 810). The $N_{TS}$ can indicate when the particular node was last updated. In an initial query, if the $N_{TS}$ of the root node of the Master Tree is temporally more recent than the $N_{TS}$ of the root node of the Permission Tree, the root node itself is a dirty node within the Permission Tree and must be reconstructed with updated information corresponding to the more recently updated corresponding root node in the Master Tree (as indicated in block 818). At that point, the flow may go onto to updating NodeTimestamps and TreeTimestamps of any parent of the dirty node as illustrated in FIG. 9. However, in this example, since the dirty node is the root node and the root node does not have any parent node (step 904), no further updates would be performed and the flow ends (as indicated in block 906).

If the $N_{TS}$ of $Node_i$ of the Master Tree is not temporally more recent than the $N_{TS}$ of $Node_i$ of the Permission Tree, this may indicate that the current node ($Node_i$) in the Permission Tree is not a dirty node and the flow may further comprise checking on child(ren) of $Node_i$ (step 812). Using Permission Tree 402 as an example, $Node_i$ may represent "Node 1" wherein "i" is initially set to 1. To proceed to a child node of "Node 1" represented by $Node_j$, "i" is set to the value of "j", representing "Node 2". A determination can then be made as to whether "Node 2" is a dirty node (step 814). If the $T_{TS}$ of $Node_i$ ("Node 2" in this example) in the Master Tree is not more temporally recent than the $T_{TS}$ of $Node_i$ in the Permission Tree, no dirty node is found and, where applicable, the flow may further comprise performing a check on any sibling node of $Node_i$ (as indicated in block 816). Again using Permission Tree 402 as an example, "Node 2" does have a sibling node represented by $Node_k$. To proceed to the sibling node, "i" is set to the value of "k", representing "Node 3". A determination can then be made as to whether "Node 3" is a dirty node (step 814). This process may be repeated until all sibling nodes of $Node_i$ have been checked.

If the $T_{TS}$ of $Node_i$ ("Node 3" in this example) in the Master Tree is more temporally recent than the $T_{TS}$ of $Node_i$ in the Permission Tree, a dirty node exists in a branch beginning with "Node 3". At this point, flow 800 may return to checking the $N_{TS}$ of $Node_i$ of the Permission Tree against the $N_{TS}$ of $Node_i$ of the Master Tree as discussed above (step 810). This process may be repeated until a dirty node is found in the Permission Tree (as indicated in block 818).

FIG. 9 depicts an example embodiment of a method for updating a tree having a dirty node therein. In one embodiment, flow 900 may assume that the dirty node (identified via flow 800) has been rebuilt (block 818). As those skilled in the art can appreciate, a node may be rebuilt, reconstructed, or otherwise reconfigured in various ways depending upon what menu item, data, or function that dirty node represents in a hierarchical navigation tree.

In one embodiment, flow 900 may comprise updating the TreeTimestamp and the NodeTimestamp of the dirty node (step 902) to reflect the time the node was reconstructed (block 818). As discussed above, if the node does not have a parent node, no need to traverse the Permission Tree from the node up (block 906). If, however, the node does have a parent node, then the parent node may have its $N_{TS}$ and $T_{TS}$ updated (step 908). This updating process may repeat from there and up the Permission Tree (steps 910, 912) until there is no more parent node that needs its TreeTimestamp be updated. In one embodiment, such a traversal may occur from a leaf node all the way to the root node of the Permission Tree.

The above-described approach can be thought of as a "lazy" method in rebuilding the cache because items that need to be rebuilt can undergo modifications while other items can be left alone. This can be advantageous because when dealing Master Trees that are continually updated, completion of updates can take a large amount of time. Taking large amounts of time can slow things down and become costly as updates can be made live. In embodiments disclosed herein, the nodes can utilize additional memory to maintain timestamps and makes comparisons between nodes. However, given that this "lazy" method can maximize what is already cached and reconstruct only what needs to be reconstructed, the reduced time spent on the updates makes it advantageous to utilize nodes that retain timestamps. This way, the method performs "lazy" updates only on the portion of the tree that needs to be updated while other portions of the tree that do not need to be updated remain unchanged.

Specific example embodiments will now be described with reference to FIGS. 10-19.

Figure 10:
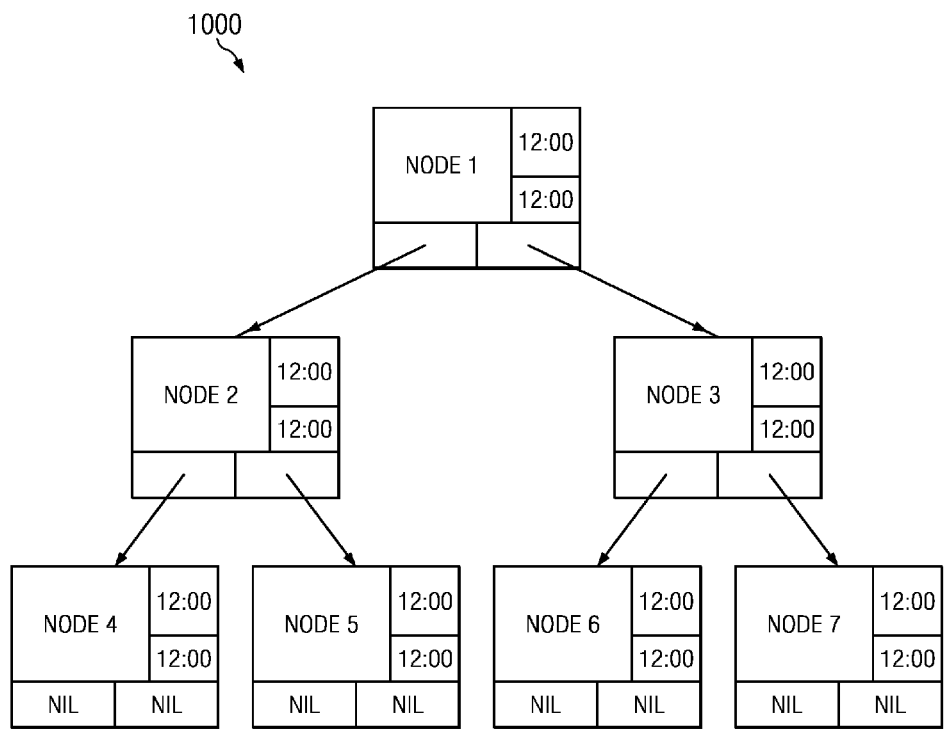
FIG. 10 depicts a diagrammatic representation of an example master navigation tree in accordance with one embodiment of the disclosure.

FIG. 10 depicts an example master navigation tree at an initial creation. In this example, Master Tree 1000 was initially created at 12:00. Each node in Master Tree 1000 (Node 1, 2, 3, 4, 5, 6, or 7) therefore has a NodeTimestamp and a TreeTimestamp of 12:00.

Figures 11A, 11B:
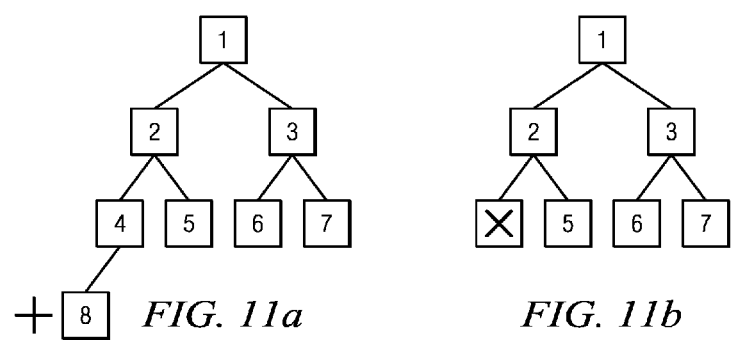
FIGS. 11a-11e illustrate by example various changes that may affect relationship(s) of nodes in a master navigation tree.
Figure 11C:
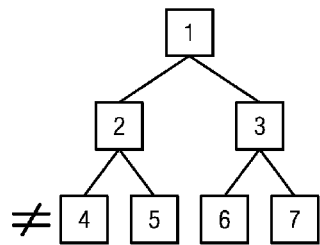
Figure 11D:
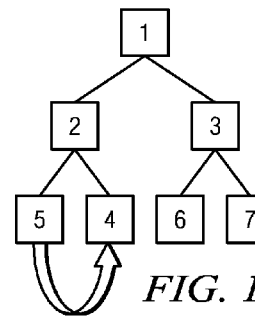
Figure 11E:
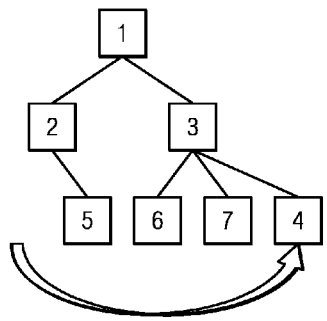

FIGS. 11*a*-11*e* illustrate by example various changes that may affect relationship(s) of nodes in Master Tree 1000. FIG. 11*a* depicts adding a node, FIG. 11*b* depicts deleting a node, FIG. 11*c* depicts editing/re-permissioning a node, FIG. 11*d* depicts reordering a node, and FIG. 11*e* depicts re-parenting a node. Generally, whenever a node in a master tree is modified, an update can be made for the node being modified, its immediate parent, and the master tree's TreeTimestamp.

More specifically, when adding a child node in a master tree, the child node and its immediate parent can update their NodeTimestamp and TreeTimestamp along with the master tree's TreeTimestamp. In the example of FIG. 11*a*, a new Node 8 is added as a child of Node 4. Both Node 4 and Node 8 may update their NodeTimestamps and TreeTimestamps corresponding to the time Node 8 was added.

In the example of FIG. 11*b*, Node 4 is deleted and the NodeTimestamp and TreeTimestamp of its parent Node 2 are updated with the time when the deletion occurred. The TreeTimestamp for the root node (in this case, Node 1) of the master tree could also be updated. In this example, Node 4 is not updated because it has been removed.

As illustrated in the examples of FIGS. 11*c*, 11*d*, and 11*e*, Node 4 can be edited, de-permissioned, re-permissioned, reordered (Node 4 is moved within Master Tree 1000 but still has the same parent Node 2 in FIG. 11*d*), or reparented (Node 4 was reparented as a child of Node 3 instead of Node 2 in FIG. 11*e*).

At this point, it might be useful to lay out some rules of which nodes get to be "touched" in each of the example cases shown in 11*a*-11*e*. More specifically:

Adding Node 8 as a child of Node 4: Node 4 (immediate parent) and Node 8 need to be touched. The NodeTimestamps of Node 8 and its immediate parent Node 4 are updated. The TreeTimestamps of Node 8, Node 4, and all parent node(s) upstream from Node 4 are also updated.

Deleting Node 4: Node 2 (immediate parent) needs to be touched (the NodeTimestamps and TreeTimestamps of Node 2 are updated). Node 4 is not touched because it has been removed.

Editing Node 4: only Node 4 needs to be touched (the NodeTimestamps and TreeTimestamps of Node 4 are updated).

Permissioning/depermissioning Node 4: Node 2 (immediate parent) and Node 4 need to be touched (the NodeTimestamps and TreeTimestamps of Node 2 and Node 4 are updated).

Reordering Node 4 with the same parent: Node 2 (immediate parent) and Node 4 need to be touched (the NodeTimestamps and TreeTimestamps of Node 2 and Node 4 are updated).

Reparenting Node 4: Node 2 (old immediate parent), Node 3 (new immediate parent), and Node 4 need to be touched (the NodeTimestamps and TreeTimestamps of Nodes 2, 3, and 4 are updated).

In each scenario, the TreeTimestamps for all parent node(s) upstream from the immediate parent node are also updated.

FIGS. 12*a*, 12*b*, 12*c*, 13*a*, 13*b*, and 13*c* further exemplify how a master navigation tree and an associated permission tree can be efficiently updated utilizing an embodiment of a method disclosed herein. In this example, Master Tree 1200 is associated with Permission Tree 1300 which, in turn, is associated with a particular user group A that has permission to view all the nodes of Permission Tree 1300 but not all the nodes in Master Tree 1200.

Figure 12A:
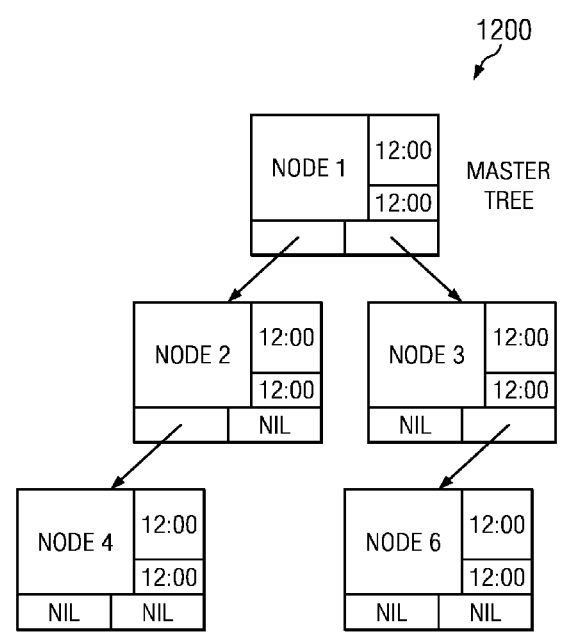
FIGS. 12a-12c and 13a-13c further exemplify how a master navigation tree and an associated permission tree can be efficiently updated utilizing an embodiment of a method disclosed herein.

Master Tree 1200 can have an initial creation time of 12:00 and therefore the timestamps of all the nodes in Master Tree 1200 (Nodes 1, 2, 3, 4, and 6) are set to an initial creation time of 12:00 (FIG. 12*a*). In one embodiment, when updating the timestamps in Permission Tree 1300, rather than using the current time when access occurred, a corresponding timestamp in Master Tree 1200 is used. For example, in FIG. 13*a*, the timestamps of all the nodes in Permission Tree 1300 (Nodes 1, 2, 3, 4, and 6) can have an initial creation time of 12:00. This time is copied from Master Tree 1200 and not when Permission Tree 1300 is created.

Figures 12B, 12C:
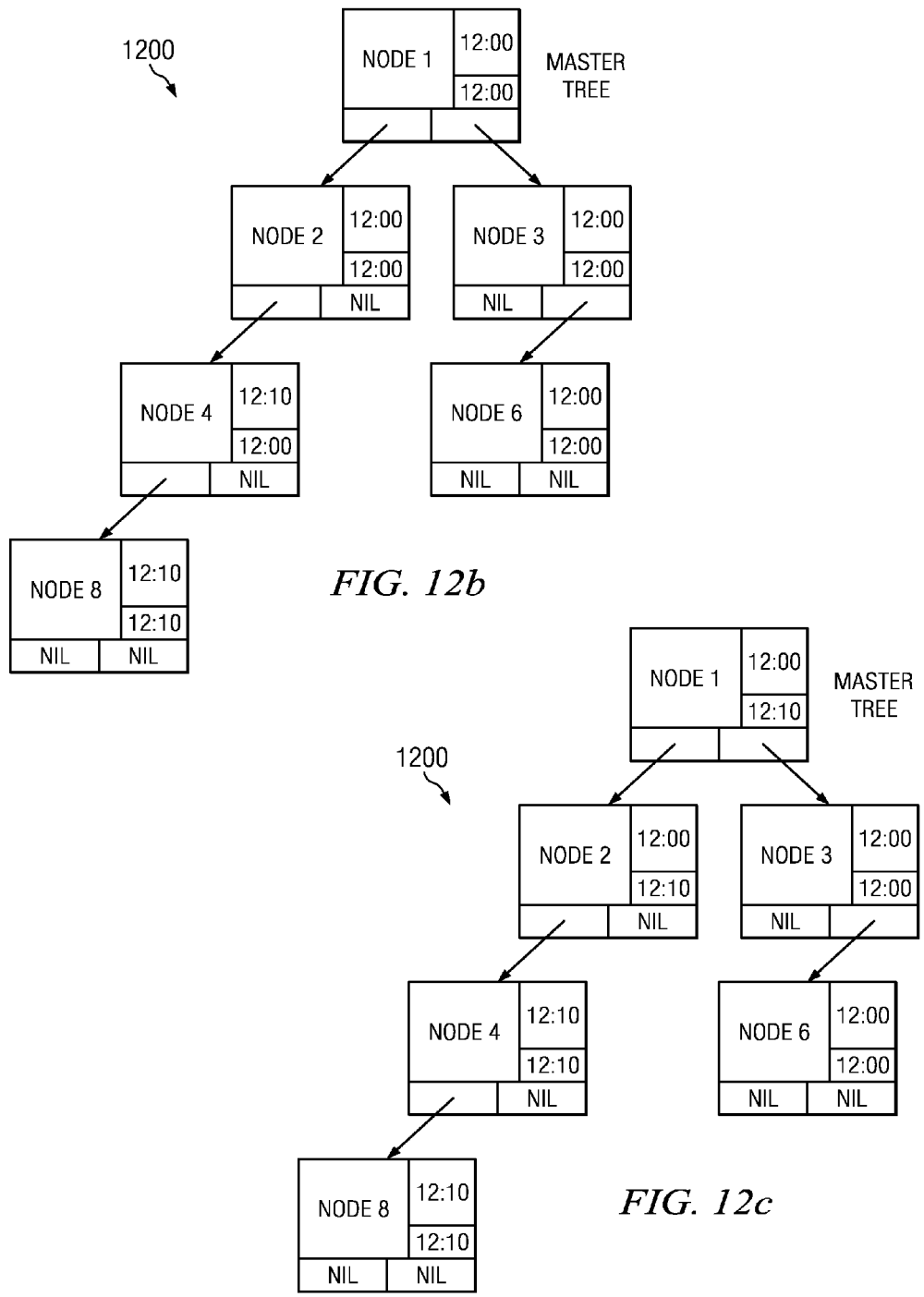

Suppose a new Node 8 is added to Master Tree 1200 as a child of Node 4 at time 12:10 (FIG. 12*b*). As a result of this addition, the NodeTimestamp and TreeTimestamp of Node 8's immediate parent Node 4 and the TreeTimestamps of all the upstream parents of Node 4 (Node 2 and Node 1 in Master Tree 1200) are updated to time 12:10 (FIG. 12*c*). As this example illustrates, the TreeTimestamp of the root node of Master Tree 1200 has been updated to indicate when Master Tree 1200 was last touched. However, since Nodes 3 and 6 (other children of Node 1) are not affected by the addition of new Node 8, they are not updated. Thus, adding a new node to Master Tree 1200 only involves a portion of Master Tree 1200 and not the entire Master Tree 1200.

Referring to FIG. 8, by comparing the updated Master Tree 1200 (shown in FIG. 12*c*) with Permission Tree 1300 (shown in FIG. 13*a*), a determination can be made (step 806) that Permission Tree 1300 has a "dirty node" (block 808). This is because the TreeTimestamp of the root node of Master Tree 1200 is now set at 12:10 which is temporally more recent than the TreeTimestamp of the root node of Permission Tree which remains at the last updated time of 12:00.

To find the "dirty" node in Permission Tree 1300, the NodeTimestamp of each node in Permission Tree 1300 is compared with the NodeTimestamp of a corresponding node in Master Tree 1200, starting with Node 1 (step 810). If the NodeTimestamp of Node 1 in Master Tree 1200 is not temporally more recent than the NodeTimestamp of corresponding Node 1 in Permission Tree 1300 (step 812), the process may proceed to check the TreeTimestamp of each child node of Node 1 (step 814), starting with Node 2. In this case, the TreeTimestamp of Node 2 in Master Tree 1200 is determined to be temporally more recent than Node 2 in Permission Tree 1300 and, therefore, the process iterates to check the NodeTimestamp of Node 2 (step 810). In this case, the NodeTimestamp of Node 2 in Master Tree 1200 is also not temporally more recent than the NodeTimestamp of Node 2 in Permission Tree 1300 (step 812) and, therefore, the process proceeds to check the TreeTimestamp of each child node of Node 2 (step 814), starting with Node 4. The TreeTimestamp of Node 4 in Master Tree 1200 is determined to be temporally more recent than Node 4 in Permission Tree 1300 and, therefore, the process again iterates to check the NodeTimestamp of Node 4 (step 810). Here, the NodeTimestamp of Node 4 in Master Tree 1200 (FIG. 12*c*) is determined to be temporally more recent than the NodeTimestamp of Node 4 in Permission Tree 1300 (FIG. 13*a*) and, therefore, Node 4 in Permission Tree 1300 is found to be a "dirty" node (block 818).

Figure 13A:
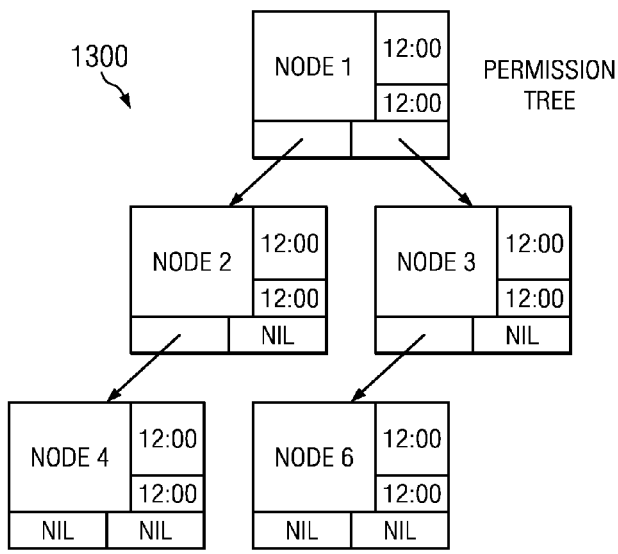
Figure 13B:
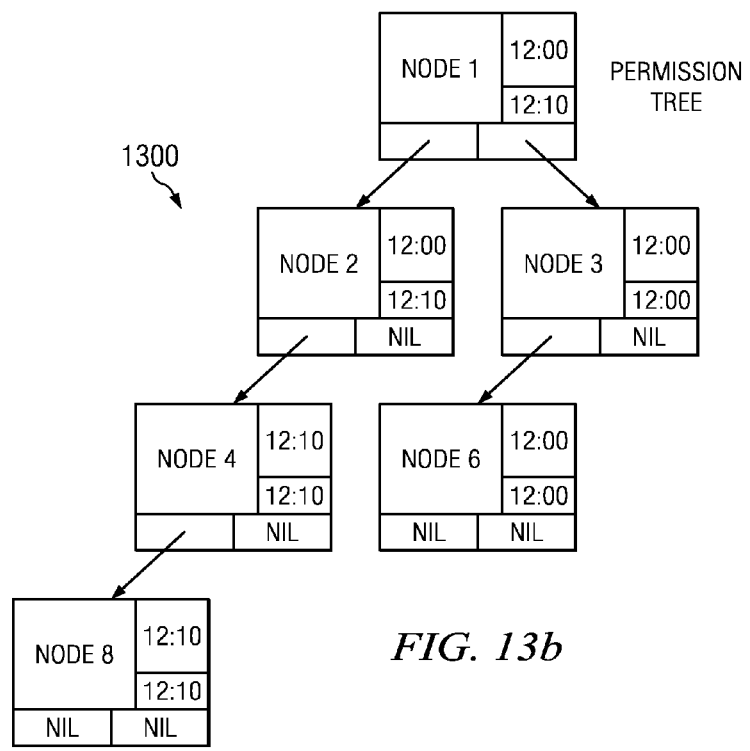

As discussed above, Master Tree 1200 was updated to add a new Node 8 as a child of Node 4. Thus, Node 4 in Permission Tree 1300 will need to be rebuilt to show that Node 8 is now a child of node 4 as reflected in Master Tree 1200. Within this disclosure, rebuilding a "dirty" node does not mean throwing away the old "dirty" node and replace with a new "clean" node. Rather, in the context of this disclosure, "rebuilding" a node refers to updating appropriate node information. For example, rebuilding Node 4 may include adding a reference to new child Node 8 and updating the timestamps for Node 4. Once rebuilding is completed, the TreeTimestamps for all upstream parent nodes of Node 4 in Permission Tree 1300 can be updated accordingly as discussed above with reference to FIG. 9. FIG. 13*b* depicts an example of an updated Permission Tree 1300.

Figure 13C:
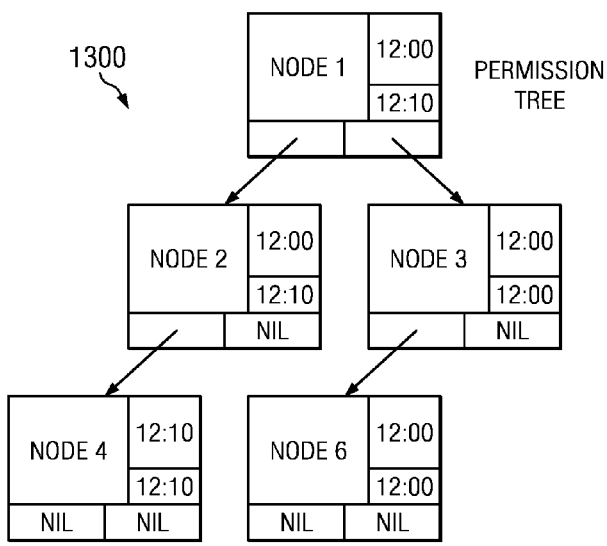

Suppose the user group A associated with Permission Tree 1300 does not have permission to the newly added Node 8, Permission Tree 1300 may be updated without adding Node 8. This is shown in FIG. 13*c*.

Advantageously, the above-described method can be even more efficient with the use of a reusable navigation block. Within this disclosure a navigation block refers to a portion or subset of a hierarchical navigation tree having a set of nodes organized in a relatively fixed hierarchical relationship. A navigation block can be utilized by sites that share the same set of nodes. As discussed above, these sites may be hosted on one or more server machines in network computing environment 200. In addition to facilitate more efficient caching, such a reusable navigation block can also reduce unnecessary database and backend calls to compute node permissions.

Figure 14:
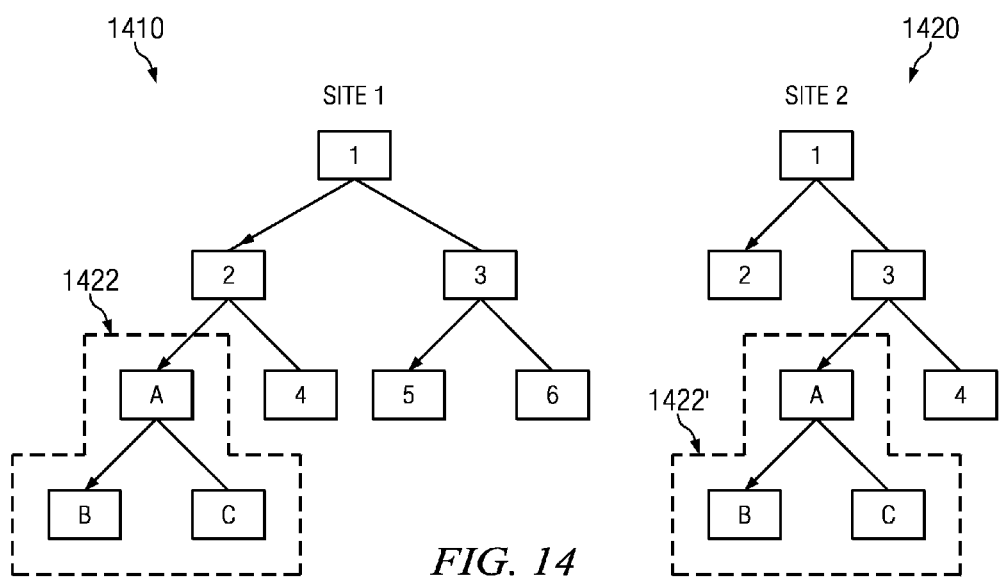
FIG. 14 depicts two example websites organized into two different hierarchies.

FIG. 14 depicts two example websites (Site 1, Site 2) organized into two different hierarchies (1410, 1420). Hierarchical navigation tree 1410 may comprise portion 1422 having nodes A, B, and C. Hierarchical navigation tree 1420 may comprise portion 1422' having the same nodes A, B, and C organized in a hierarchical relationship in the same manner as those in portion 1422 of hierarchical navigation tree 1410. These portions (1422 in hierarchical navigation tree 1410 and 1422' in hierarchical navigation tree 1420) can be replaced with a single navigation block, an example of which is shown in FIG. 15.

Figure 15:
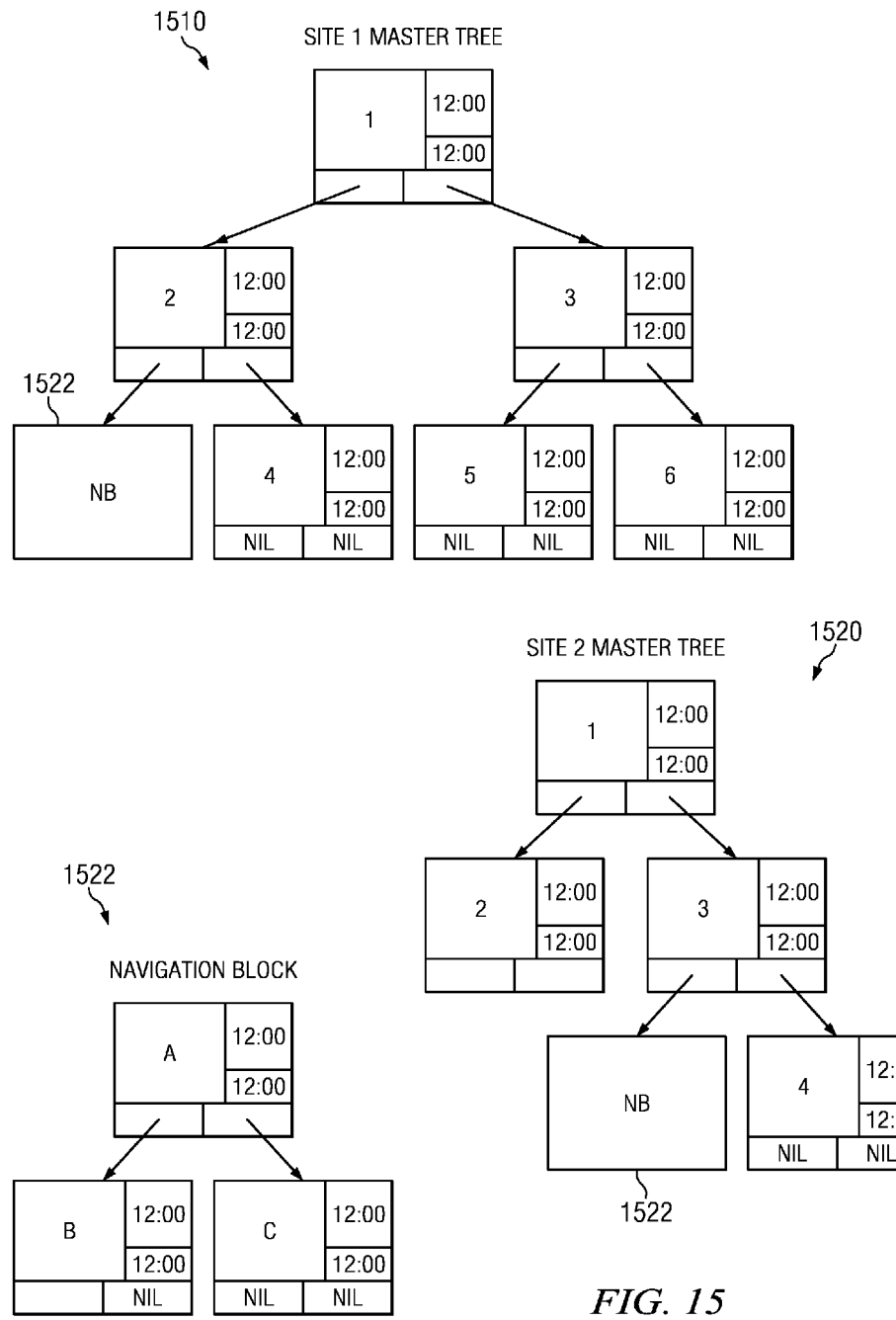
FIG. 15 depicts an example of a reusable navigation block.

As illustrated in FIG. 15, Navigation Block 1522 may itself be considered a tree having a root note. A pointer from Node 2 of Master Tree 1510 for Site 1 may reference the root node of Navigation Block 1522. Similarly, a pointer from Node 3 of Master Tree 1520 for Site 2 may reference Navigation Block 1522 by pointing to the root node of Navigation Block 1522.

FIGS. 16*a*-16*b* and 17*a*-17*b* depict diagrammatic representations of one example embodiment of a method for efficient caching of hierarchical items across multiple sites, utilizing a reusable navigation block.

Figure 16A:
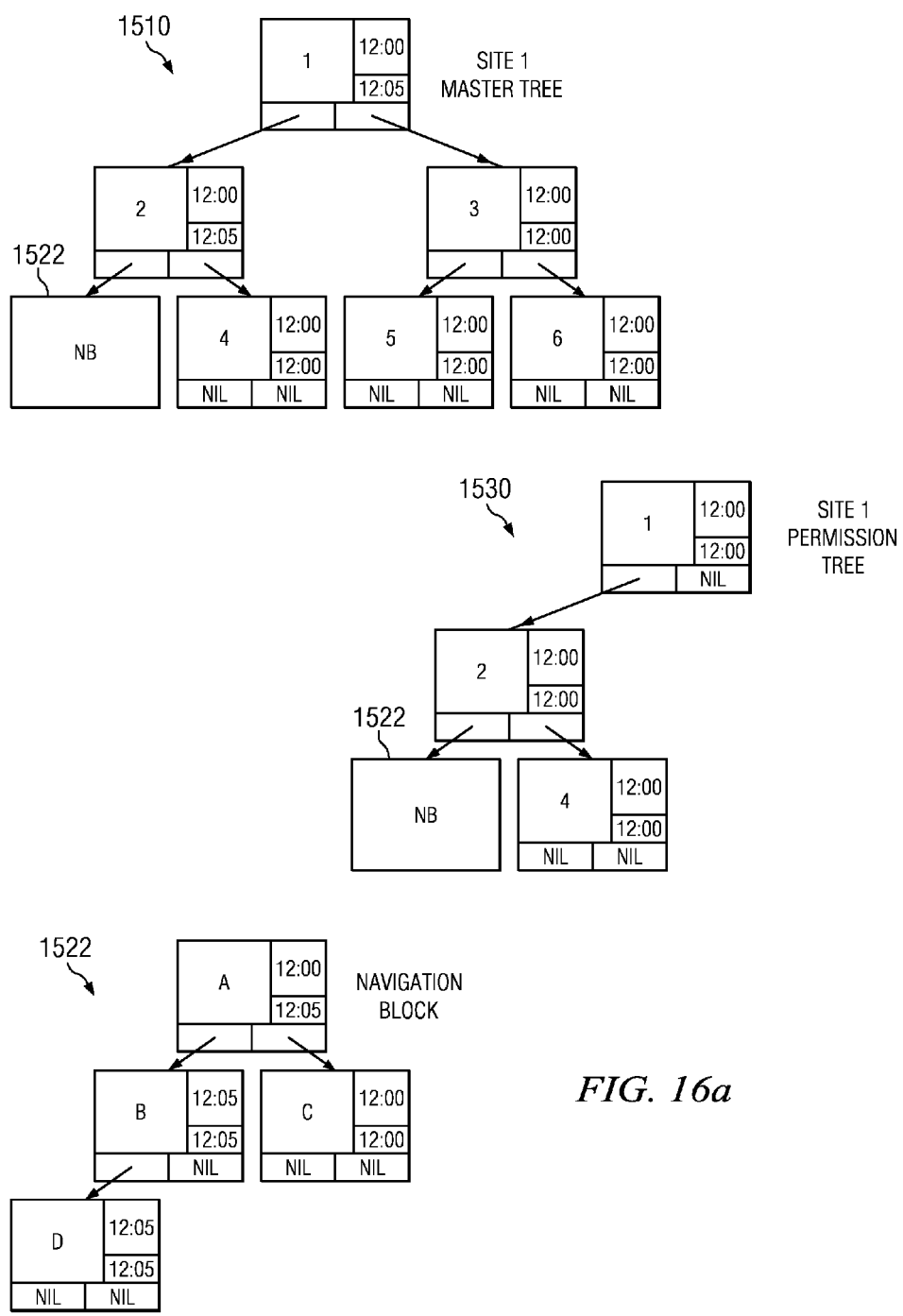
FIGS. 16a-16b and 17a-17b depict diagrammatic representations of one example embodiment of a method for efficient caching of hierarchical items across multiple sites, utilizing a reusable navigation block.
Figure 16B:
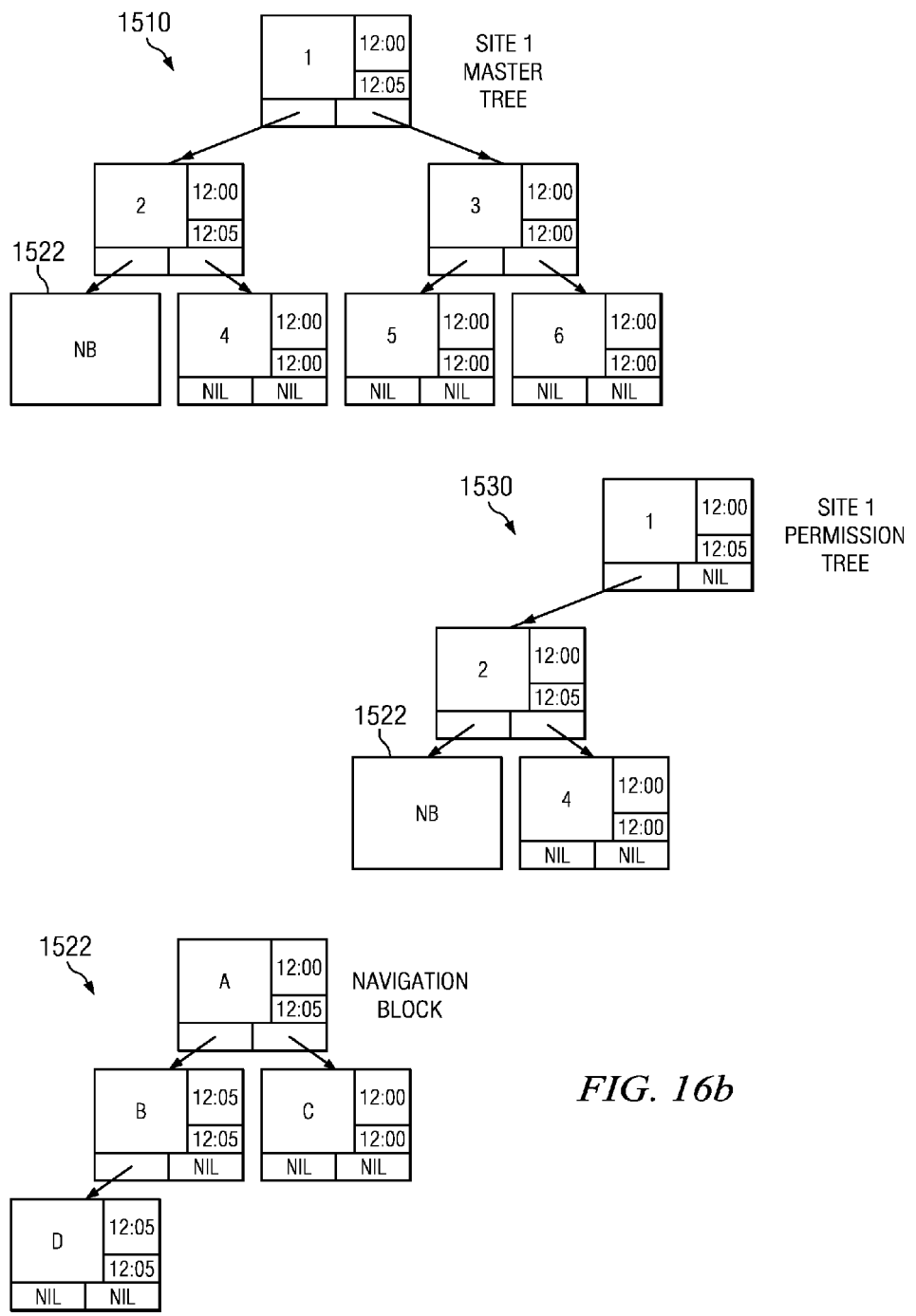

FIGS. 16*a*-16*b* depict nodes in Site 1 Master Tree 1510 and Site 1 Permission Tree 1530. In this case, both Site 1 Master Tree 1510 and Site 1 Permission Tree 1530 reference Navigation Block 1522 and have a creation time of 12:00. Navigation Block 1522 can also have an initial creation time of 12:00. In FIG. 16*a*, Navigation Block 1522 has been updated to add a new node D. As described above, in adding a new node, the NodeTimestamp and the TreeTimestamp of the new node and its immediate parent are updated, as well as the TreeTimestamp(s) of all parent node(s) upstream from the immediate parent. More specifically, in this example, node D was added at 12:05. This time can be reflected in its NodeTimestamp and its TreeTimestamp. Because node B is an immediate parent to node D, its NodeTimestamp and TreeTimestamp are also updated to 12:05. Since node A is a parent of node B, its TreeTimestamp can be updated to 12:05 to show that Navigation Block 1522 was last touched at 12:05.

In addition to updating the TreeTimestamp of Navigation Block 1522, the parent nodes in Site 1 Master Tree 1510 and Site 1 Permission Tree 1530 upstream from Navigation Block 1522 may also be updated. More specifically, as illustrated in FIG. 16*a*, the TreeTimestamps of Node 2 referencing Navigation Block 1522 and its parent Node 1 for Site 1 Master Tree 1510 can be updated. Both Node 2 and Node 1 in Site 1 Master Tree 1510 are upstream parents for Navigation Block 1522 and so their TreeTimestamps are updated to 12:05—the time when node D was added to Navigation Block 1522. Likewise, as illustrated in FIG. 16*b*, the TreeTimestamps of Node 2 referencing Navigation Block 1522 and its parent Node 1 for Site 1 Permission Tree 1530 can be updated to 12:05.

Notice in this case, node D was added to Navigation Block 1522. If a user group associated with Site 1 Permission Tree 1530 does not have permission to node D, Site 1 Permission Tree 1530 may no longer reference Navigation Block 1522 and may be updated as described above without adding node D. If the user group associated with Site 1 Permission Tree 1530 does have permission to node D, Site 1 Permission Tree 1530 may simply be updated to reflect the new TreeTimestamp(s) of upstream parent node(s) of Navigation Block 1522.

Figure 17A:
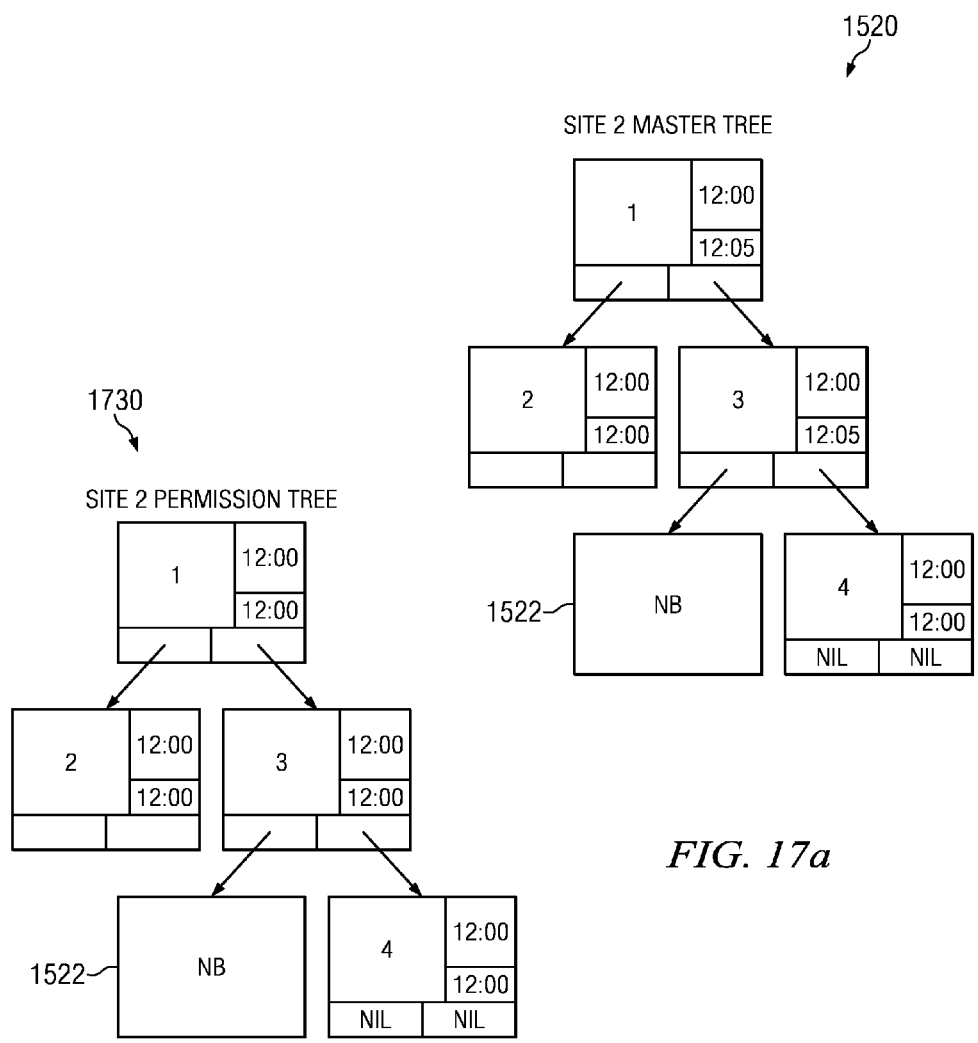
Figure 17B:
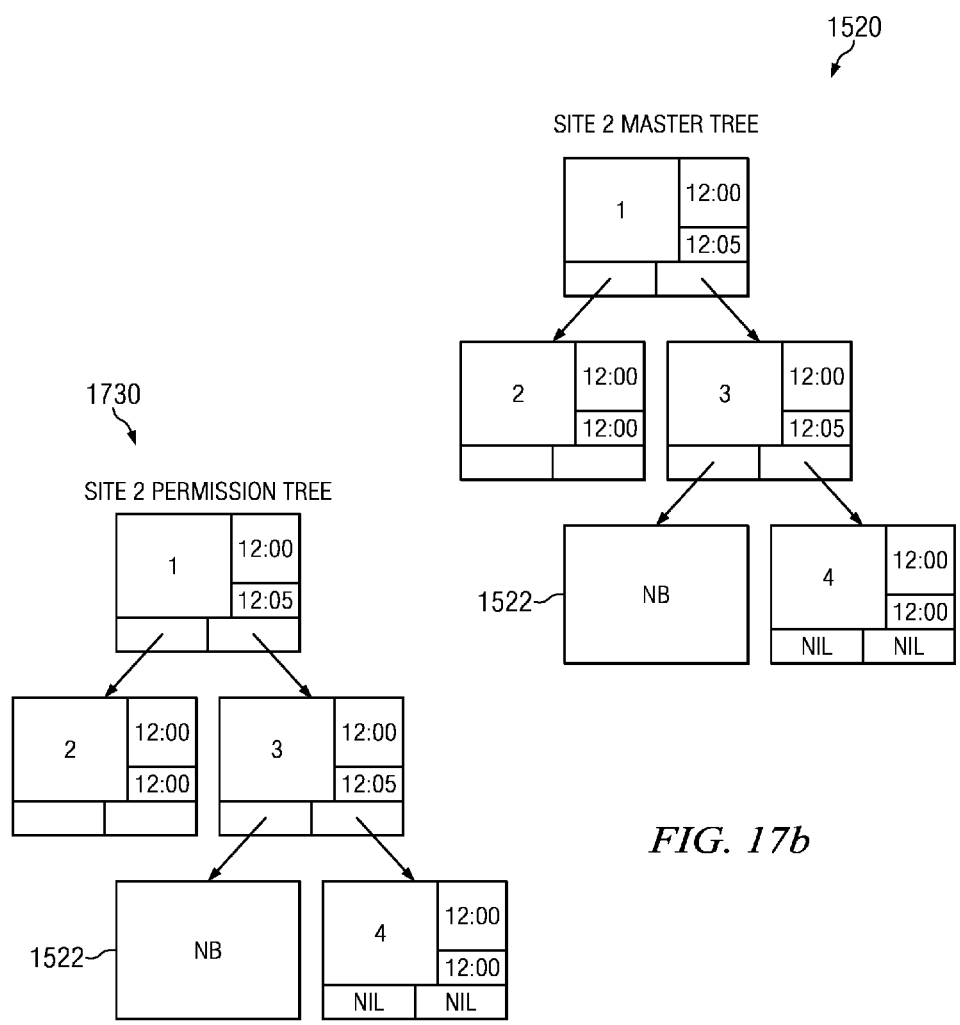

FIGS. 17*a*-17*b* depict nodes in Site 2 Master Tree 1520 and Site 2 Permission Tree 1730. In this case, Site 2 Master Tree 1520 and Site 2 Permission Tree 1730 also reference Navigation Block 1522. Referring to FIG. 15, Site 2 Master Tree 1520 may initially have a creation time of 12:00. Since Site 2 Master Tree 1520 and Site 2 Permission Tree 1730 also reference Navigation Block 1522, updating Navigation Block 1522 as discussed above with reference to FIG. 16*a* may also cause the TreeTimestamps of parent nodes (Node 3, Node 1 in this example) in Site 2 Master Tree 1520 and Site 2 Permission Tree 1730 upstream from Navigation Block 1522 be updated, as illustrated in FIG. 17*a* for Site 2 Master Tree 1520 and in FIG. 17*b* for Site 2 Permission Tree 1730.

Again, if a user group associated with Site 2 Permission Tree 1730 does not have permission to node D in Navigation Block 1522, Site 2 Permission Tree 1730 may no longer reference Navigation Block 1522 and may be updated as described above without adding node D. If the user group associated with Site 2 Permission Tree 1730 does have permission to node D, Site 2 Permission Tree 1730 may simply be updated to reflect the new TreeTimestamp(s) of upstream parent node(s) of Navigation Block 1522.

As described above, a hierarchical navigation tree disclosed herein may represent an organization of a private or proprietary network site own and operated by an entity such as an international commercial company having multiple brands and thousands or more employees distributed across continents. The network site may have many different functions accessible by various groups of users via webpages and/or menu items thereof. For example, the top level of the network site may be divided into Departments, Business Units, Administration, Corporate Communications, etc. Each of these may be further subdivided into a hierarchical structure, such as Departments may be divided into Marketing, Engineering, Service, etc., and each of these may be even further subdivided based on region, particular product or brand, and so on. Each of these divisions and subdivisions may be associated a group of users that are permitted to access a portion or subset of the hierarchical navigation tree representing the network site.

As an example, a network site may have thousands of menu items and hundreds of user groups. In one embodiment, a user group may inherit permissions from another user group. For example: an "Austin-based Product X Engineering Group" may inherit its permissions from "US Engineering Group" which inherits permissions from "North America Engineering Group" which, in turn, inherits permissions from "Engineering Group."

Because of the extensive size of the hierarchical navigation tree representing the network site and of the user groups permissioned to access various portions thereof, it is often the case that an administrator may need to make modification(s), for instance, add/delete/move/edit/re-permission menu item, etc., during working hour when other users are accessing the site. Previously, such modification(s) would be very costly because many users can experience a penalty in terms of long waits (>1 minute) to access a webpage in the network site. Embodiments disclosed herein can allow these modifications to occur without having to pay a hefty penalty. As an example, even when live updates are performed on the hierarchical navigation tree representing the network site, users could still access a webpage in the network site with access time at about or less than 3 seconds, which can be a significant reduction from previous methods.

To illustrate this advantage, suppose a master navigation tree has 1000 menu items supporting 100 different user groups. Suppose at time 12:00 a navigation item in the master navigation tree is modified, for instance, added, removed, moved, edited, re-permissioned, etc., by an administrator staff. At time 12:01, a user belonging to a particular group (G1) having 5 members may try to access the network site represented by the master navigation tree. Previously, updating the menu item in the master navigation tree at time 12:00 would include destroying the entire cached permission tree. Thus, when the user associated with the now destroyed permission tree tries to access at time 12:01, the entire permission tree would be recomputed for the user group to which the user belongs. The cost for recalculating the entire permission tree can be substantial. Suppose it takes 15 milliseconds to make a query to the database to compute the permission for a single menu item, the total time needed to recomputed the permission tree might be 15 milliseconds×1000 menu items×5 queries=75 seconds. Computing the permission for the user group G1 may require 5 queries to a database storing the permission tree because, in this example, a user group in average may have 4 other upstream user groups from where it may inherit permissions.

Thus, at time 12:01, this particular user may need to wait 1 minute 15 seconds just to be able to access the webpage. Subsequent access by the same user (or users in the same group G1) will not incur this long wait. However, access by another user from another group (G2) may experience the long wait (having the same or a different length of delay in time).

With this prior approach, the situation may be worse off when the network site is hosted on a cluster of server machines. If there is another user who belongs to group G1 and who accesses the network site through another server in the cluster, it is likely that the cached Permission Tree has not been computed yet, and so that user will incur a 75 seconds wait to be able to see the web page.

Embodiments disclosed herein can advantageously avoid such a long delay. As described above, a computation may be made to update a permission tree partially without destroying most of what's already been cached. Depending on the number of siblings that a navigation item has (S), there may be re-computing permissions only for S+1 nodes, instead of having to recomputed the entire permission tree with tens of thousands of nodes. Eliminating or substantially eliminating the downtime caused by the delay in the prior approach can mean preserving precious productivity to a large organization.

Various embodiments described herein may also be advantageous in other circumstances. For example, suppose a network site or a portion thereof is accessible by a client machine external to the private network, various embodiments described may be adapted to be applicable to extranet scenarios and internet scenarios. In this case, a dedicated permission tree may be created for users external to the private network permitted to navigate the network site or a portion thereof. As another example, such a network site may be a social networking site and different user groups on the social networking site may be associated with different permission trees representing various parts of the social networking site.

Some embodiments described herein can be most useful for intranet and/or extranet network sites where an organization may have a need to expose a large number of pages to a large number of users. These pages may be referred to as navigation items as they may refer to static/dynamic pages, or applications, etc. As a non-limiting example, the number of pages for such an organization may be in the hundreds if not thousands.

Due to the nature of information architecture/security, this organization may want to limit what each individual users/roles of a network site can access via some permissioning/authorization scheme. In a conventional web site, a developer may design a static site map and color-code the web pages of the web site to indicate who can access which part of the web site. As mentioned above, there can be a long delay when web pages need to be updated to correctly reflect any change to the site map. Embodiments disclosed herein provide a "lazy" and yet robust approach in which only the necessary potion(s) of any cached permission tree will be updated to reflect corresponding change(s) to a master navigation tree.

Figure 18:
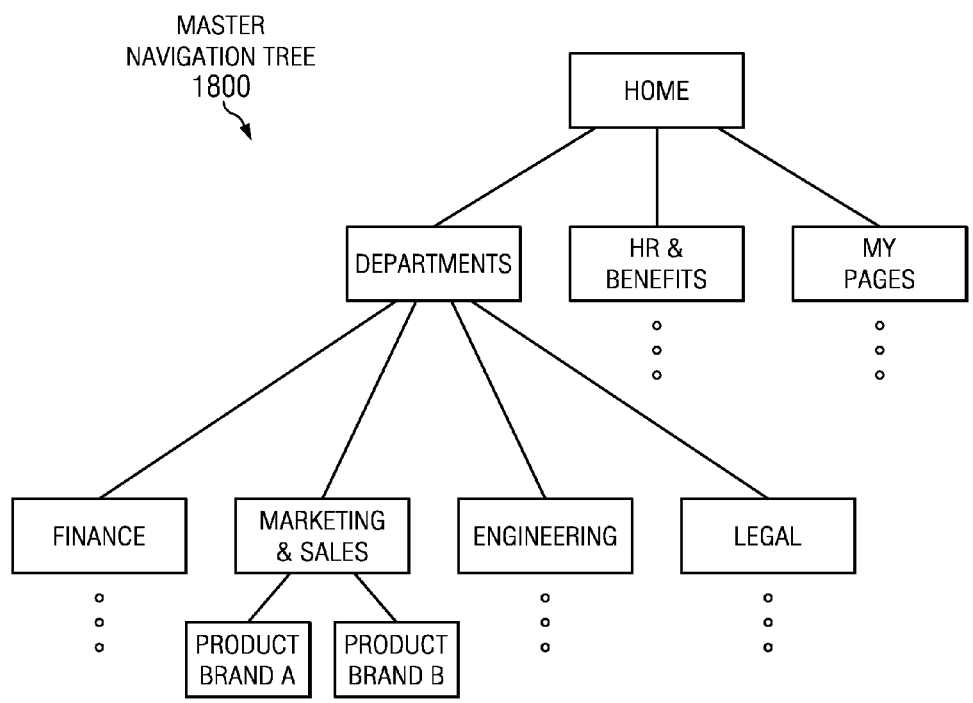
FIG. 18 depicts an example master navigation tree for a network site.
Figure 19:
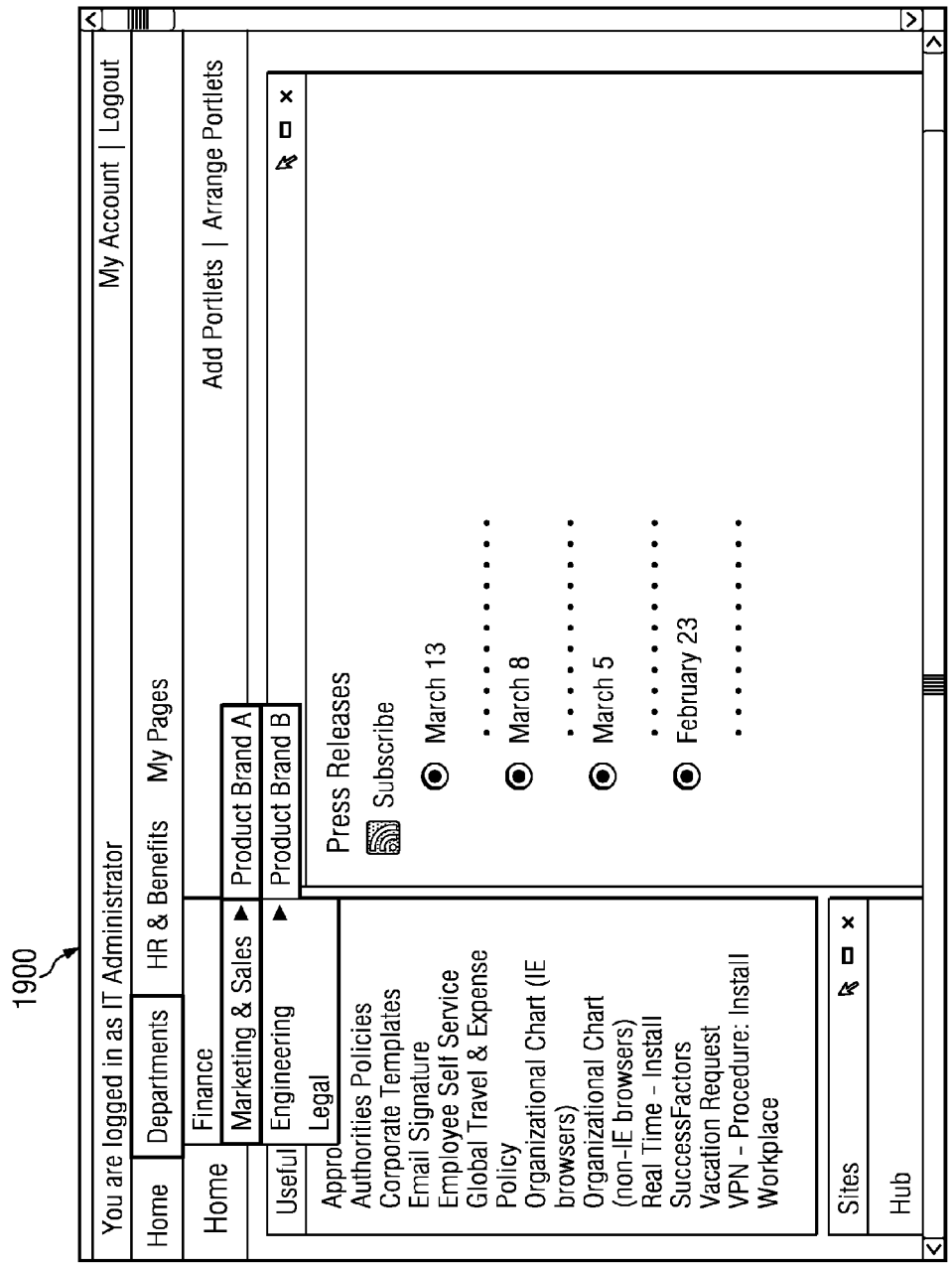
FIG. 19 depicts a diagrammatic representation of an authorized user logged into the network site implementing the example master navigation tree of FIG. 18.

As an even more specific example, FIG. 18 depicts master navigation tree 1800 for example network site 1900 shown in FIG. 19. Those skilled in the art will appreciate that network site 1900 is a simplified example. Depending on the size, need, and complexity of an organization, their master navigation tree/hierarchy can be massive. The same site and navigation hierarchy may be used by the organization as an intranet to serve tens of thousands of employees and exposed as an extranet accessible by the organization's partner(s). Thus, all the contents may be served out from the same site and there is only one place to find their contents. Further, extensive permissioning scheme may be implemented such that certain individuals/roles may only see a subset of the whole navigation tree. In the simplified example of FIG. 19, when an authorized user ("IT Administrator") is logged in, all the nodes in master navigation tree 1800 are visible through network site 1900 is visible, including all the children nodes of the Departments node (i.e., the Finance node, the Marketing & Sales node, the Engineering node, the Legal node, and children nodes thereof.)

Figure 20:
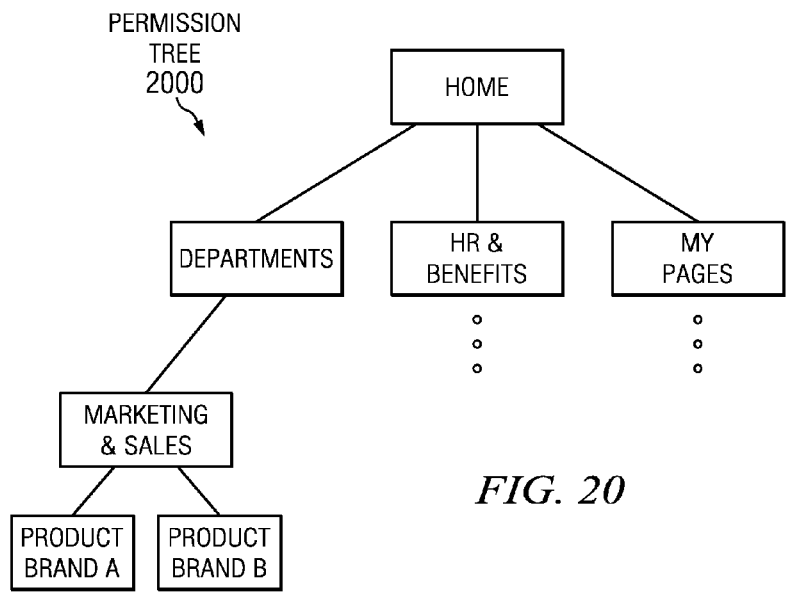
FIG. 20 depicts a diagrammatic representation of a permission tree associated with an example role for the network site.
Figure 21:
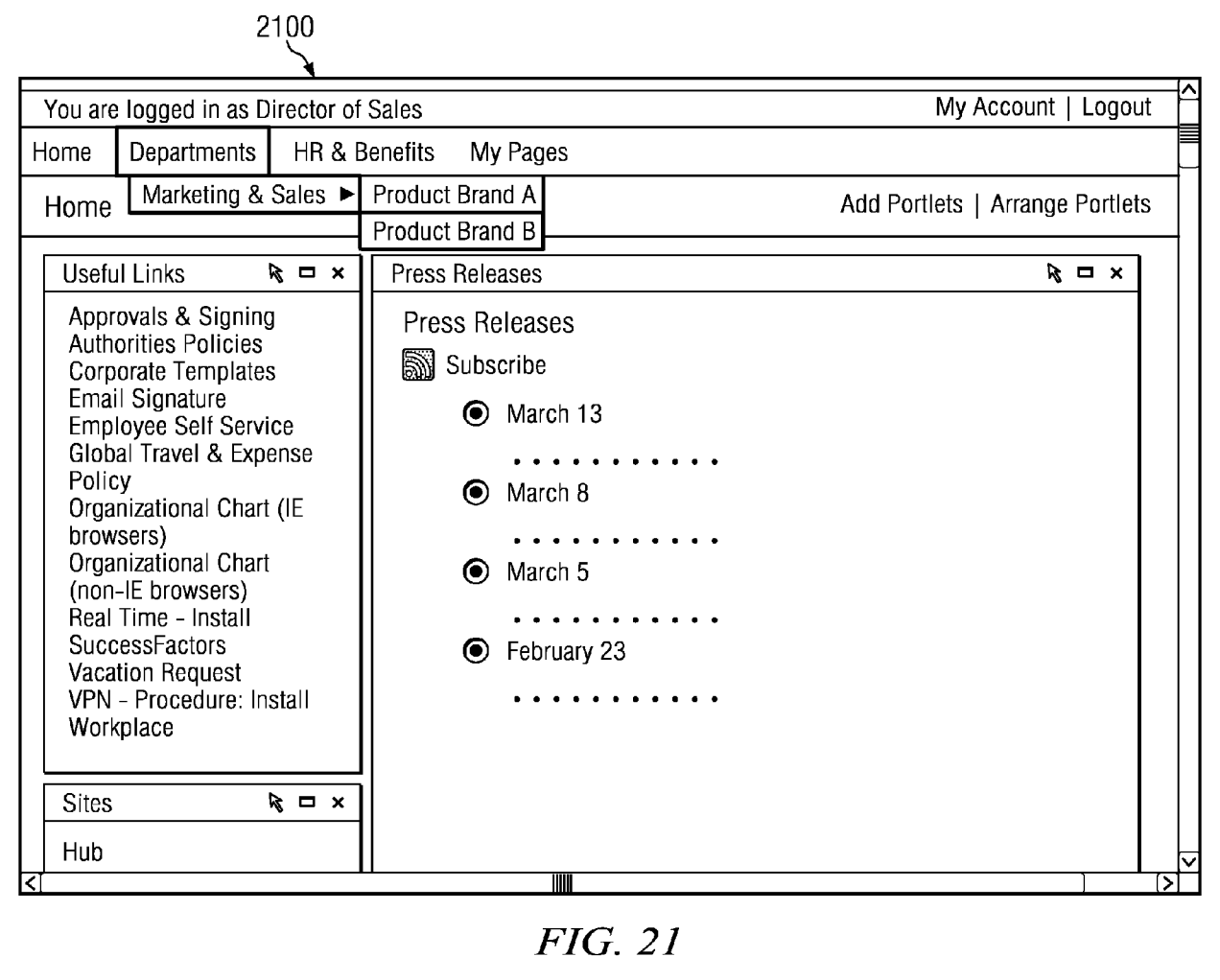

FIG. 20 depicts a diagrammatic representation of permission tree 2000 associated with an example role "Director of Sales" in which a user is allowed to view a subset of master navigation tree 1800, including the Marketing & Sales node and children nodes thereof (i.e., the Product Brand A node and the Product Brand B node) and excluding other children nodes of the Departments node. Thus, when a user is logged in as "Director of Sales", the user can only view nodes in permission tree 2000. FIG. 21 depicts a diagrammatic representation of screenshot 2100 illustrating a view of a version of network site 1900 implementing permission tree 2000.

Figure 24:
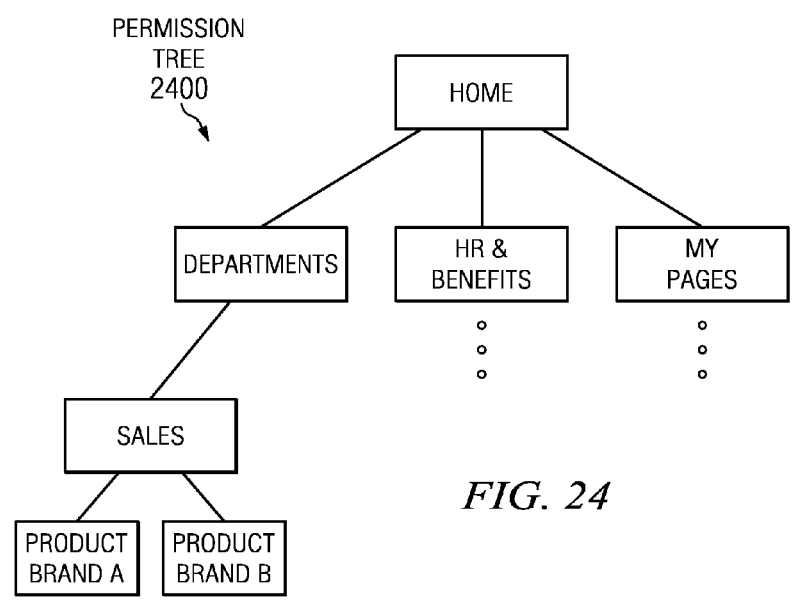
FIG. 24 depicts a diagrammatic representation of an example permission tree updated to reflect the same change to a portion of the example permission tree associated with the example role of FIG. 20.
Figure 22:
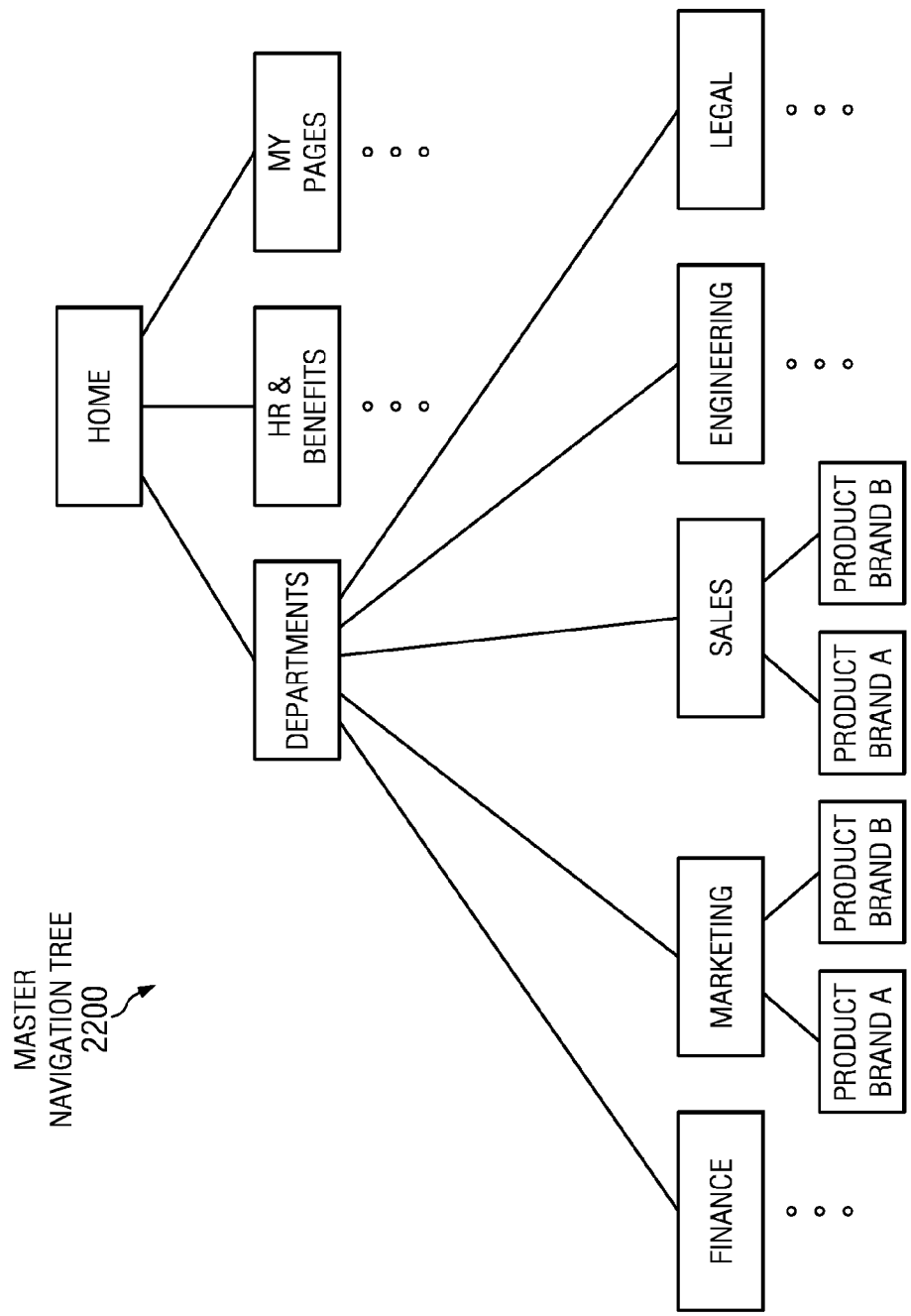
FIG. 22 depicts a diagrammatic representation of an example master navigation tree updated to reflect a change to a portion of the example master navigation tree of FIG. 18.
Figure 23:
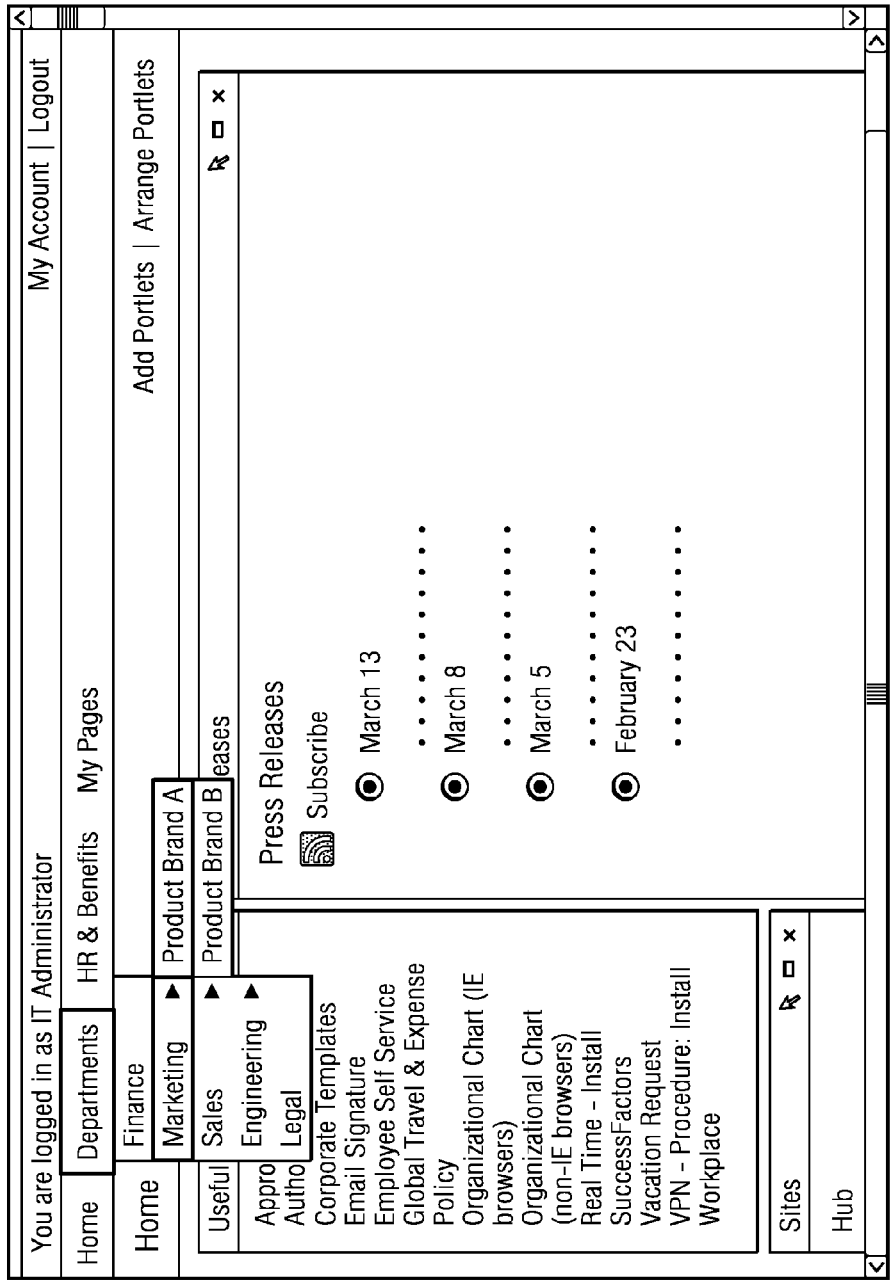
FIG. 23 depicts a diagrammatic representation of a screenshot corresponding to the network site implementing the updated master navigation tree of FIG. 22.
Figure 25:
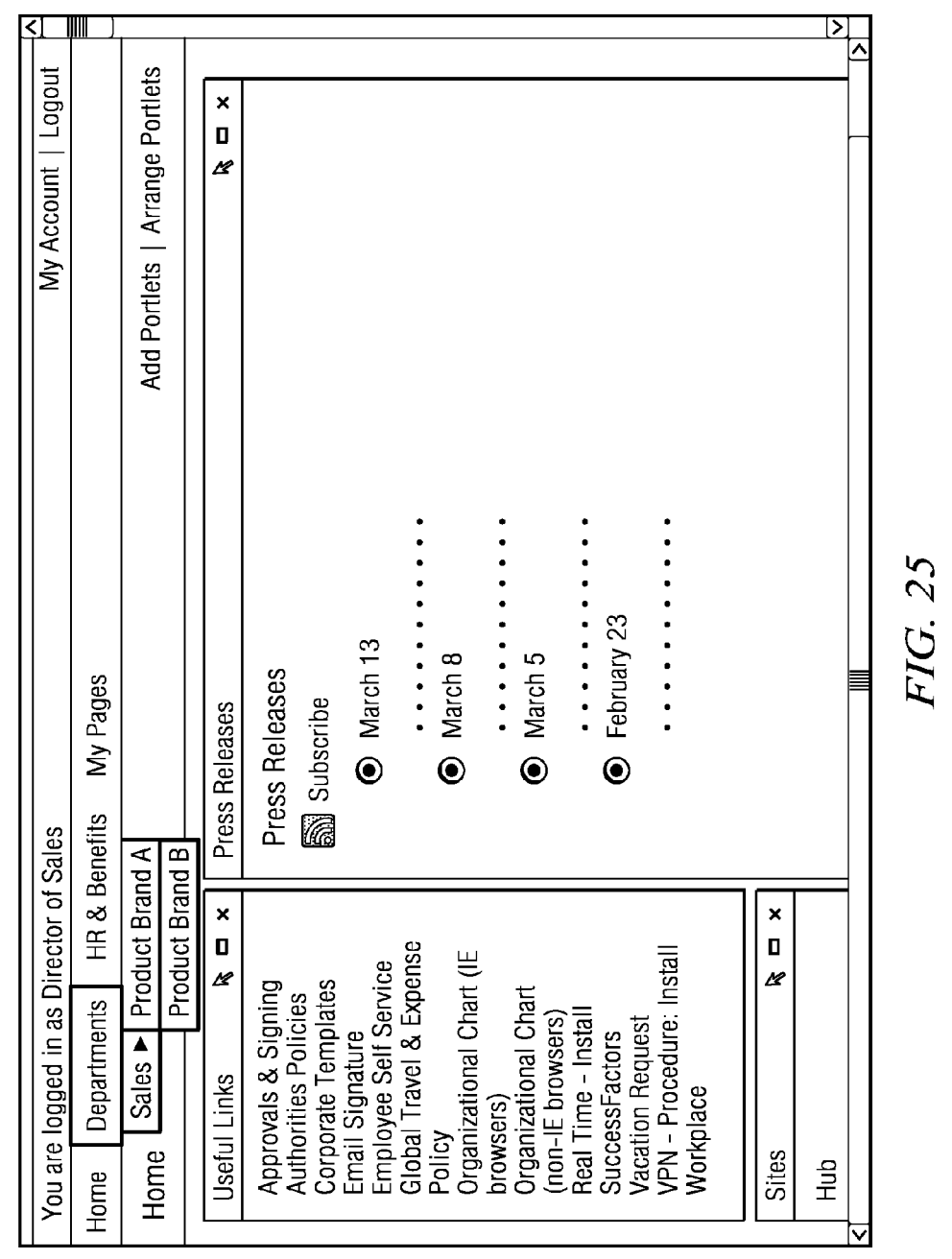

Suppose a decision is made to split the Marketing & Sales department into two separate departments. FIG. 22 depicts a diagrammatic representation of updated master navigation tree 2200. FIG. 23 depicts a diagrammatic representation of a screenshot corresponding to network site 1900 implementing updated master navigation tree 2200. Utilizing the "lazy" approach discussed above, only a subset of master navigation tree 1800 needs to be updated to produce updated master navigation tree 2200. In this example, the "Marketing & Sales" node was renamed to "Marketing" and a new "Sales" node is created, referencing "Product Brand A" and "Product Brand B" pages. The "Director of Sales" role is being depermissioned from the "Marketing" node (originally called "Marketing * Sales") and is granted permission to the newly created "Sales" node. FIG. 24 depicts a diagrammatic representation of updated permission tree 2400 for the "Director of Sales" role. Again, utilizing the "lazy" approach discussed above, only a subset of permission tree 2000 needs to be updated to produce updated permission tree 2400 for the "Director of Sales" role. FIG. 25 depicts a diagrammatic representation of a screenshot corresponding to network site 1900 implementing updated permission tree 2400 for the "Director of Sales" role. As discussed above, because only a portion of the tree being affected by a change to the tree needs to be updated, updating the tree can be done in an extremely efficient and fast manner, requiring little or no downtime.

Exemplary hardware architecture for use in conjunction with embodiments of a method that can effectively cache a hierarchical navigation tree with permissions is described to provide context. While it may useful to an understanding of the method of caching a hierarchical navigation tree with permissions in conjunction with such an exemplary architecture, it will be understood that embodiments of cache management may also be implemented in conjunction with a wide variety of other architectures.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method of caching hierarchical items in a network environment, the method comprising:
    performing, by a server computer in the network environment:
        caching a copy of a hierarchical navigation tree, the cached copy of the hierarchical navigation tree having nodes representing hierarchical items of a web site, each node in the cached copy of the hierarchical navigation tree having a tree timestamp and a node timestamp;
        in response to a change to a first node in the cached copy of the hierarchical navigation tree, updating the tree timestamp and the node timestamp of a parent node of the first node and updating the tree timestamp of any upstream parent node of the parent node of the first node in the cached copy of the hierarchical navigation tree such that only a portion of the cached copy of the hierarchical navigation tree affected by the change to the first node is updated;
        comparing the tree timestamp of a root node of the cached copy of the hierarchical navigation tree with a tree timestamp of a root node of a cached copy of a permission tree;
        if the tree timestamp of the root node of the cached copy of the hierarchical navigation tree is more recent than the tree timestamp of the root node of the cached copy of the permission tree, comparing the node timestamp of each node in the cached copy of the hierarchical navigation tree and the node timestamp of each node in the cached copy of the permission tree until a dirty node in the cached copy of the permission tree is found;
        constructing the dirty node in the cached copy of the permission tree relating to the change to the first node in the cached copy of the hierarchical navigation tree; and
        building a portion of the cached copy of the permission tree containing the dirty node by updating the tree timestamp and the node timestamp of the dirty node in the cached copy of the permission tree and traversing the cached copy of the permission tree from the dirty node to the root node of the cached copy of the permission tree to update the tree timestamp of any upstream parent node of the dirty node in the cached copy of the permission tree.

2. The method according to claim 1, further comprising:
    associating the hierarchical navigation tree with one or more permission trees, each permission tree of the one or more permission trees having a set of nodes representing access restriction of a group of users to the web site.

3. The method according to claim 2, further comprising:
    caching the hierarchical navigation tree and the one or more permission trees in a hierarchical cache on the server computer.

4. The method according to claim 1, further comprising:
    tracking a temporal point in time when each node in the hierarchical navigation tree was last updated using the node timestamp.

5. The method according to claim 1, wherein the change represents adding the first node, deleting the first node, reordering the first node, re-permissioning the first node, de-permissioning the first node, re-parenting the first node, or editing the first node.

6. The method according to claim 1, further comprising:
    in response to a request from a user, updating a portion of a permission tree associated with the user, the portion of the permission tree containing one or more dirty nodes in comparison to corresponding nodes in the hierarchical navigation tree.

7. The method according to claim 6, further comprising: determining each of the one or more dirty nodes in the portion of the permission tree by:
   comparing a root tree timestamp of the hierarchical navigation tree with a root tree timestamp of the permission tree;
   if the root tree time stamp of the hierarchical navigation tree is more recent than the root tree timestamp of the permission tree, comparing node timestamps of nodes in the permission tree with node timestamps of corresponding nodes in the hierarchical navigation tree; and
   if a node time stamp for a node in the hierarchical navigation tree is not more recent than a node time stamp for a corresponding node in the permission tree, comparing a tree timestamp for the node in the hierarchical navigation tree with a tree timestamp for the corresponding node in the permission tree.

8. The method according to claim 1, wherein the parent node is a direct parent of the first node.

9. A computer program product comprising at least one non-transitory computer readable medium storing instructions translatable by a server computer where a copy of a hierarchical navigation tree is cached, the cached copy of the hierarchical navigation tree having nodes representing hierarchical items of a web site, each node in the cached copy of the hierarchical navigation tree having a tree timestamp and a node timestamp, the instructions when translated by the server computer cause the server computer to perform:
   in response to a change to a first node in the cached copy of the hierarchical navigation tree, updating the tree timestamp and the node timestamp of a parent node of the first node and updating the tree timestamp of any upstream parent node of the parent node of the first node in the cached copy of the hierarchical navigation tree such that only a portion of the cached copy of the hierarchical navigation tree affected by the change to the first node is updated;
   comparing the tree timestamp of a root node of the cached copy of the hierarchical navigation tree with a tree timestamp of a root node of a cached copy of a permission tree;
   if the tree timestamp of the root node of the cached copy of the hierarchical navigation tree is more recent than the tree timestamp of the root node of the cached copy of the permission tree, comparing the node timestamp of each node in the cached copy of the hierarchical navigation tree and the node timestamp of each node in the cached copy of the permission tree until a dirty node in the cached copy of the permission tree is found;
   constructing the dirty node in the cached copy of the permission tree relating to the change to the first node in the cached copy of the hierarchical navigation tree; and
   building a portion of the cached copy of the permission tree containing the dirty nodes in node by updating the tree timestamp and the node timestamp of the dirty node in the cached copy of the permission tree and traversing the cached copy of the permission tree from the dirty node to the root node of the cached copy of the permission tree to update the tree timestamp of any upstream parent node of the dirty node in the cached copy of the permission tree.

10. The computer program product of claim 9, wherein the instructions when translated by the server computer further cause the server computer to perform:
   associating the hierarchical navigation tree with one or more permission trees, each permission tree of the one or more permission trees having a set of nodes representing access restriction of a group of users to the web site.

11. The computer program product of claim 9, wherein the instructions when translated by the server computer further cause the server computer to perform:
   tracking a temporal point in time when each node in the hierarchical navigation tree was last updated using the node timestamp.

12. The computer program product of claim 9, wherein the change represents adding the first node, deleting the first node, reordering the first node, re-permissioning the first node, de-permissioning the first node, re-parenting the first node, or editing the first node.

13. The computer program product of claim 9, wherein the instructions when translated by the server computer further cause the server computer to perform:
   in response to a request from a user, updating a portion of a permission tree associated with the user, the portion of the permission tree containing one or more dirty nodes in comparison to corresponding nodes in the hierarchical navigation tree.

14. The computer program product of claim 13, wherein the instructions when translated by the server computer further cause the server computer to perform:
   determining each of the one or more dirty nodes in the portion of the permission tree by:
      comparing a root tree timestamp of the hierarchical navigation tree with a root tree timestamp of the permission tree;
      if the root tree time stamp of the hierarchical navigation tree is more recent than the root tree timestamp of the permission tree, comparing node timestamps of nodes in the permission tree with node timestamps of corresponding nodes in the hierarchical navigation tree; and
      if a node time stamp for a node in the hierarchical navigation tree is not more recent than a node time stamp for a corresponding node in the permission tree, comparing a tree timestamp for the node in the hierarchical navigation tree with a tree timestamp for the corresponding node in the permission tree.

15. A system, comprising:
   a server computer caching a copy of a hierarchical navigation tree, the cached copy of the hierarchical navigation tree having nodes representing hierarchical items of a web site, each node in the cached copy of the hierarchical navigation tree having a tree timestamp and a node timestamp, the server computer configured to perform:
      in response to a change to a first node in the cached copy of the hierarchical navigation tree, updating the tree timestamp and the node timestamp of a parent node of the first node and updating the tree timestamp of any upstream parent node of the parent node of the first node in the cached copy of the hierarchical navigation tree such that only a portion of the cached copy of the hierarchical navigation tree affected by the change to the first node is updated;

comparing the tree timestamp of a root node of the cached copy of the hierarchical navigation tree with a tree timestamp of a root node of a cached copy of a permission tree;

if the tree timestamp of the root node of the cached copy of the hierarchical navigation tree is more recent than the tree timestamp of the root node of the cached copy of the permission tree, comparing the node timestamp of each node in the cached copy of the hierarchical navigation tree and the node timestamp of each node in the cached copy of the permission tree until a dirty node in the cached copy of the permission tree is found;

constructing the dirty node in the cached copy of the permission tree relating to the change to the first node in the cached copy of the hierarchical navigation tree; and building a portion of the cached copy of the permission tree containing the dirty node by updating the tree timestamp and the node timestamp of the dirty node in the cached copy of the permission tree and traversing the cached copy of the permission tree from the dirty node to the root node of the cached copy of the permission tree to update the tree timestamp of any upstream parent node of the dirty node in the cached copy of the permission tree.

16. The system of claim 15, wherein the server computer is further configured to perform:

associating the hierarchical navigation tree with one or more permission trees, each permission tree of the one or more permission trees having a set of nodes representing access restriction of a group of users to the web site.

17. The system of claim 16, wherein the hierarchical navigation tree and the one or more permission trees are cached in a hierarchical cache on the server computer.

18. The system of claim 15, wherein the server computer is further configured to perform:

tracking a temporal point in time when each node in the hierarchical navigation tree was last updated using the node timestamp.

19. The system of claim 15, wherein the change represents adding the first node, deleting the first node, reordering the first node, re-permissioning the first node, de-permissioning the first node, re-parenting the first node, or editing the first node.

20. The system of claim 15, wherein the server computer is further configured to perform:

in response to a request from a user, updating a portion of a permission tree associated with the user, the portion of the permission tree containing one or more dirty nodes in comparison to corresponding nodes in the hierarchical navigation tree.

21. The system of claim 20, wherein the server computer is further configured to perform:

determining each of the one or more dirty nodes in the portion of the permission tree;

comparing a root tree timestamp of the hierarchical navigation tree with a root tree timestamp of the permission tree;

if the root tree time stamp of the hierarchical navigation tree is more recent than the root tree timestamp of the permission tree, comparing node timestamps of nodes in the permission tree with node timestamps of corresponding nodes in the hierarchical navigation tree; and if a node time stamp for a node in the hierarchical navigation tree is not more recent than a node time stamp for a corresponding node in the permission tree, comparing a tree timestamp for the node in the hierarchical navigation tree with a tree timestamp for the corresponding node in the permission tree.

* * * * *